US010825356B2

(12) United States Patent
McNichol et al.

(10) Patent No.: US 10,825,356 B2
(45) Date of Patent: Nov. 3, 2020

(54) SYSTEM AND METHOD FOR DETERMINING AND PROVIDING BEHAVIOURAL MODIFICATION MOTIVATIONAL CUES

(71) Applicant: SmartSpark, Inc., Los Angeles, CA (US)

(72) Inventors: Ariel Dana McNichol, Los Angeles, CA (US); Oliver Eberle, Los Angeles, CA (US); Kyle V. Brinkman, Manhattan Beach, CA (US)

(73) Assignee: SmartSpark, Inc., Los Angeles, CA (US)

( * ) Notice: Subject to any disclaimer, the term of this patent is extended or adjusted under 35 U.S.C. 154(b) by 482 days.

(21) Appl. No.: 15/399,507

(22) Filed: Jan. 5, 2017

(65) Prior Publication Data
US 2017/0193851 A1    Jul. 6, 2017

Related U.S. Application Data

(60) Provisional application No. 62/275,054, filed on Jan. 5, 2016.

(51) Int. Cl.
*G09B 5/06* (2006.01)
*G09B 19/00* (2006.01)

(52) U.S. Cl.
CPC ......... *G09B 19/0092* (2013.01); *G09B 5/065* (2013.01); *G09B 19/003* (2013.01)

(58) Field of Classification Search
CPC ... G09B 19/0092; G09B 19/003; G09B 5/065
See application file for complete search history.

(56) References Cited

U.S. PATENT DOCUMENTS 5,967,789 A * 10/1999 Segel .................. G06F 19/3481
434/236
6,769,915 B2 * 8/2004 Murgia .................... G09B 5/06
434/127

(Continued)

OTHER PUBLICATIONS

Kohavi et al., "Practical Guide to Controlled Experiments on the Web: Listen to Your Customers not to the HiPPO", In Proceedings of the 13th ACM SIGKDD international conference on Knowledge discovery and data mining, 2007, San Jose, California, pp. 1-9 (9 pages).

(Continued)

*Primary Examiner* — Corbett B Coburn
(74) *Attorney, Agent, or Firm* — Lewis Rice LLC

(57) ABSTRACT

A method for generating a motivational spark for a user, the method comprising generating a user content request, the user content request comprising a request for a user to perform at least one motivational action while a user-generated content portion is being recorded; recording the user-generated content portion by a user device; receiving the user-generated content by a motivational system from the user device; determining a user-specific sequence of content portions; generating, by the motivational system, at least one user-specific content portion based on user personal information and the user-specific sequence of content portions; and mixing, by the motivational system, the user-generated content portion with the at least one user-specific content portion based on user-specific sequence of content portions to generate the motivational spark for future playback.

17 Claims, 33 Drawing Sheets

(56) References Cited

U.S. PATENT DOCUMENTS

| | | | | |
|---|---|---|---|---|
| 7,123,696 | B2* | 10/2006 | Lowe | G06F 16/40 |
| | | | | 379/88.16 |
| 7,606,778 | B2 | 10/2009 | Dewar | |
| 7,874,841 | B1* | 1/2011 | Lycas | G09B 5/00 |
| | | | | 434/236 |
| 7,967,731 | B2 | 6/2011 | Kil | |
| 2004/0016437 | A1* | 1/2004 | Cobb | G06Q 30/02 |
| | | | | 131/270 |
| 2006/0161850 | A1* | 7/2006 | Seaberg | G06F 40/186 |
| | | | | 715/744 |
| 2006/0265267 | A1 | 11/2006 | Chen et al. | |
| 2007/0011027 | A1* | 1/2007 | Melendez | A63B 24/0062 |
| | | | | 705/2 |
| 2010/0037170 | A1 | 2/2010 | Poole | |
| 2010/0082356 | A1 | 4/2010 | Verma et al. | |
| 2011/0015958 | A1 | 1/2011 | April et al. | |
| 2013/0216989 | A1* | 8/2013 | Cuthbert | G09B 19/00 |
| | | | | 434/238 |
| 2014/0157171 | A1 | 6/2014 | Brust et al. | |
| 2014/0365408 | A1 | 12/2014 | Snyder et al. | |
| 2015/0243175 | A1* | 8/2015 | Raman | G09B 5/00 |
| | | | | 434/236 |
| 2015/0379891 | A1* | 12/2015 | Wallace | G09B 19/00 |
| | | | | 434/236 |
| 2016/0219931 | A1* | 8/2016 | Doshi | A24F 15/005 |

OTHER PUBLICATIONS

Siroker, "How Obama Raised $60 Million by Running a Simple Experiment", Optimizely Blog, 2010 <https://blog.optimizely.com/2010/11/29/how-obama-raised-60-million-by-running-a-simple-experiment> (7 pages).

Christian, "The A/B Test: Inside the Technology That's Changing the Rules of Business", Wired Magazine, 2012 <https://www.wired.com/2012/04/ff_abtesting> (17 pages).

Thaler, et al., "Nudge: Improving Decisions About Health, Wealth, and Happiness", Penguin Books, Revised & Expanded edition, 2009, pp. 11-13, 54, 55, and 131 (6 pages).

* cited by examiner

Your Progress

Exercise Series 1

Days 2 of 5     success your rating ✓ ✓ ○    100%

>7% A1C ✓ ✓ ○    50%

✓ → ✓ → ⊙ → ○ → ○

ACTION REQUIRED to get your next SmartSpark

[ Fuel your next SmartSpark ]

Bliss Series 1

Days 4 of 4     success your rating ✓ ✓ ✓ ✓    100%

8hr sleep ✓ ✓ ✓ ✓    75% home    manager    progress    more

SYSTEM AND METHOD FOR DETERMINING AND PROVIDING BEHAVIOURAL MODIFICATION MOTIVATIONAL CUES

CROSS REFERENCE TO RELATED APPLICATION(S)

This application claims the benefit of U.S. Provisional Application Ser. No. 62/275,054, filed Jan. 5, 2016. The entire disclosure of which is incorporated by reference herein.

BACKGROUND

1. Field of the Invention

The present subject-matter relates to systems and methods for determining and providing behavioral modification motivational sparks (cues).

2. Description of the Related Art

People all over the world suffer the negative consequences of poor lifestyle habits, from obesity and smoking related illnesses, to the negative effects of stress and depression. Many want to be happier, to be healthier and to live more productive lives. There is an urgent need for methods to improve personal habits, behaviors, or moods. There is also a need to connect socially, and many have become addicted to receiving messages and personalized news feeds.

Women and younger women in particular desire tools to help motivate them. They are also shown to actively share their efforts with friends and to seek peer support. They are also most comfortable with taking selfies.

Existing applications for improving behaviors and habits are text-based and require too much reading and writing. They are also location- and time-insensitive and provide too little social interaction.

SUMMARY

In a first aspect, there is a method for generating a motivational spark for a user. In at least one embodiment, the method may include generating a user content request, the user content request including prompting the user to perform at least one motivational action while a user-generated content portion is being recorded; recording the user-generated content portion using a user device; receiving the user-generated content by a motivational system from the user device; determining a user-specific sequence of content portions; generating, by the motivational system, at least one user-specific content portion based on user personal information and the user-specific sequence of content portions; and mixing, by the motivational system, the user-generated content portion with the at least one user-specific content portion based on user-specific sequence of content portions to generate the motivational spark for future playback.

In at least one embodiment, the method may also include determining the at least one motivational action based on a user goal, the user goal being obtained from the user.

In at least one embodiment, the method may also include determining the at least one motivational action based on a user behavior step, the user behavior step being determined by the system or being obtained from the user.

In at least one embodiment, the method may also include determining the at least one motivational action based on the user personal information and/or user physical data.

In at least one embodiment, the method may also include the user being prompted to provide the user personal information prior to generating the motivational spark, the user personal information being at least one of gender, age, ethnicity, location.

In at least one embodiment, the motivational spark may also be generated based on the user physical data, the user physical data being obtained from at least one monitoring device.

In at least one embodiment, the motivational action may be determined based on the user physical data, the user physical data being obtained from at least one monitoring device.

In at least one embodiment, the motivational system may also request and receive a peer-generated content portion from a peer device, the peer device being different from the user device. The motivational system may mix the peer-generated content portion with the at least one user-specific content portion to generate the motivational spark.

In at least one embodiment, the user-generated content portion (user selfie) may comprise at least one of a video, a picture, a text and an audio recording.

In at least one embodiment, the method may also include requesting and receiving third party generated content. The third party content may be filtered based on user personal information.

In at least one embodiment, the method may also include requesting the user to schedule the motivational sparks to be transmitted to the user device at least one of a specific time and a specific location of the user device.

In at least one embodiment, the method may also include requesting and receiving user feedback.

In at least one embodiment, the determining user-specific sequence of content portions may be based on optimization criteria. The optimization criteria may comprise at least one of a time-related criteria (time of the day, month, etc.), user's preference, length of spark (suggested, adjusted, calculated), length of peer support video, pacing of music, pacing of content portions, user feedback and feedback on user physical data.

In at least one embodiment, the method may also include sending a request for and receiving third party generated content, the third party generated content being at least one of a video, a picture, a text, and an audio recording.

In at least one embodiment, the at least one user-specific content portion may comprise at least one of an audio recording, at least one image, at least one video, at least one text.

In a second aspect, there is provided a method for generating a motivational spark for a user. The method may include requesting a user goal at the user device; determining, at at least one of the user device and a server, at least one motivational action based on the user goal, requesting user permission to access at least one of a camera, a photo album, and a microphone at the user device. The method may also include requesting the user to perform the at least one motivational action while recording a self-recording. The method may also include requesting the user to submit user personal information, requesting user permission to send at least one alert when the motivational spark is ready, requesting the user to provide sign-in information, requesting the user to specify a schedule and means of receiving alerts and/or motivational content, submitting the self-recording, user personal information and sign-in information to the server. The method may also include generating at least one user-specific content portion based on user personal information. The method may also include mixing, at the server, the self-recording with the at least one user-specific content portion to generate the motivational spark.

In another aspect, a method for generating a motivational spark for a user is provided. The method may include displaying a first motivational spark at a user device; requesting user feedback at the user device; receiving user feedback by a server; determining, at the system server, at least one next motivational action based on a user goal and the user feedback; requesting, at the user device, the user to perform the at least one next motivational action while recording a self-recording with the user device; submitting the self-recording, user personal information, and sign-in information to the server; generating at least one user-specific content portion based on the user personal information and the user feedback; and mixing, at the server, the self-recording with the at least one user-specific content portion to generate the motivational spark.

In another aspect, there is provided a non-transient computer-readable medium. The computer-readable medium may include instructions executable by one or more processors, wherein the instructions, when executed, configure the one or more processors to collectively generate a user content request, the user content request including a request for a user to perform at least one motivational action while a user-generated content portion is being recorded; record the user-generated content portion; receive the user-generated content; determine a user-specific sequence of content portions; generate at least one user-specific content portion based on user personal information and the user-specific sequence of content portions; and mix the user-generated content portion with the at least one user-specific content portion based on user-specific sequence of content portions to generate the motivational spark for future playback.

In another aspect, there is provided a motivational system for generating a motivational spark. The motivational system may include a memory storing computer readable instructions, and at least one processor configured to execute the computer readable instructions. The computer readable instructions may configure the at least one processor to collectively generate a user content request, the user content request including a request for a user to perform at least one motivational action while a user-generated content portion is being recorded, record the user-generated content portion, receive the user-generated content, determine a user-specific sequence of content portions, generate at least one user-specific content portion based on user personal information and the user-specific sequence of content portions, and mix the user-generated content portion with the at least one user-specific content portion based on user-specific sequence of content portions to generate the motivational spark for future playback.

BRIEF DESCRIPTION OF THE FIGURES

For a better understanding of the embodiments described herein and to show more clearly how they may be carried into effect, reference will now be made, by way of example only, to the accompanying drawings which show at least one exemplary embodiment, and in which:

FIGS. 12, 13, 14A, 14B, 15, 16, 17, 18, 19, 20, 21, 22, 23, 24, 25 and 26 illustrate example embodiments of a graphical user interface (GUI) provided for the system, in accordance with an embodiment.

Figure 1:
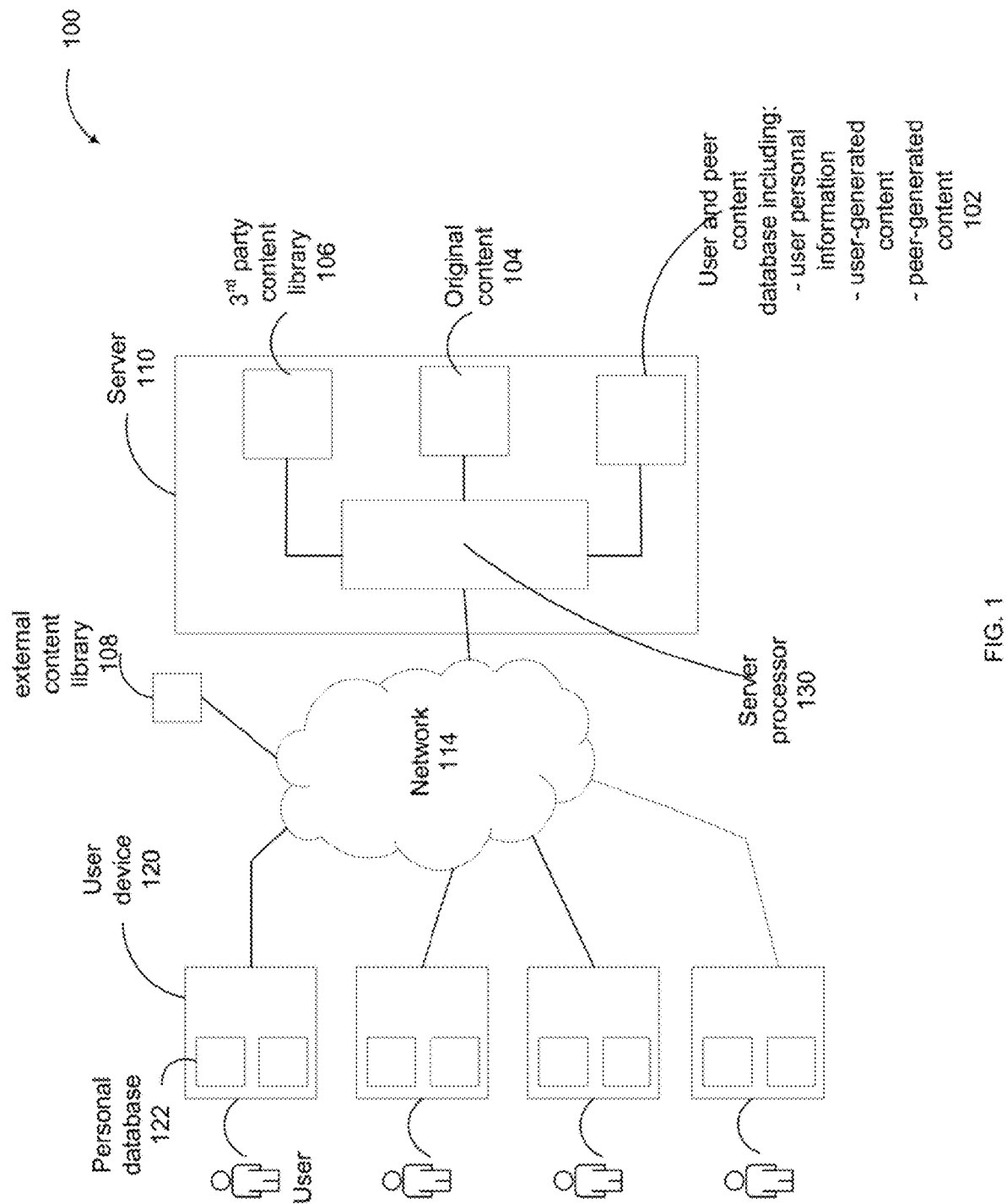
FIG. 1 is a schematic view of an example embodiment of a system for determining and providing motivational sparks.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF PREFERRED EMBODIMENT(S)

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "one or more embodiments", "some embodiments", and "one embodiment" mean "one or more (but not all) embodiments of the present invention(s)", unless expressly specified otherwise.

The terms "including", "comprising" and variations thereof mean "including but not limited to", unless expressly specified otherwise. A listing of items does not imply that any or all of the items are mutually exclusive, unless expressly specified otherwise. The terms "a", "an" and "the" mean "one or more", unless expressly specified otherwise.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by end points herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The various embodiments of the systems and methods described herein may be implemented in hardware or software, or a combination of both. For example, some embodiments may be implemented in computer systems and computer programs, which may be stored on a physical computer readable medium, executable on programmable computers (e.g. computing devices and/or processing devices) each comprising at least one processor, a data storage system (including volatile and non-volatile memory and/or storage elements), at least one input device (e.g. a keyboard, mouse or touchscreen), and at least one output device (e.g. a display screen, a network, or a remote server). For example, and without limitation, the programmable computers may include servers, personal computers, laptops, tablets, personal data assistants (PDA), cell phones, smart phones, gaming devices, watches, and other mobile devices. Program code can be applied to input data to perform the functions described herein and to generate output information. The output information can then be supplied to one or more output devices for outputting to one or more users.

Definitions

Described herein is a system 100 and a method for generating and sending "motivational sparks" (also referred to herein as "sparks" or "smartsparks" or "SmartSparks" or "behavioral modification motivational sparks" or "reminders" or "video reminders" or "cues"), to users. The motivational sparks are designed to motivate the users to perform certain desirable behavior(s).

External triggers as described herein refer to nudges in the user's environment that provide information for what to do next. A button telling the user to "click here", "tweet this", or "play now", are all examples of external triggers.

For example, the external triggers may be defined from APIs/SDKs. For example, an external trigger could be defined as heart rate above a certain heart beat threshold, as coming from, for example, Apple Watch. Or, if weather feed indicates rain, than this external trigger changes suggested exercise from outdoor run to indoor activity.

Internal triggers as used herein refer to those triggers relying upon associations in the user's mind to prompt actions, such as, for example, checking social media. The most frequent internal triggers are emotions.

Visualization as used herein refers to seeing a desired outcome in both an individual's mind and through digital representations. For example, sport training commonly refers to the use of visualization. For example, visualization may be solicited by asking users to imagine a scenario, and to identify and build digital representations of themselves.

An avatar as used herein is a digital representation of the individual. The representation may take the form of an image of a human figure created in the likeness of the individual. For example, the user may pick variables of skin color, hair color, body type, etc.

The motivational spark as described herein may be also referred to as SmarkSpark or motivational content sequence or a behavior cue. The user-generated content portion as described herein is also referred to herein as a user selfie or selfie. The user-generated content portion may include a video, an audio recording, a text, and/or an image.

The user-specific content portion as described herein is an audio content (e.g. at least one portion of an audio recording), motivational content, and/or other content specific for the particular user. For example, the user-specific content portion may be at least one of an audio recording, at least one image, at least one video, and at least one text.

The user-specific sequence of content portions as described herein is a specific sequence which determines a way to arrange portions of video/text/music/third party images, etc. This may be based on many factors described herein and may depend on the user and his preferences/characteristics, time, etc. The user goal as described herein is an aspiration of the user, and may include such aspirations as "eat healthy", "exercise", feel bliss, send a friend joy, etc.

Referring to FIG. 1, shown therein is an example embodiment of a system 100 for determining and providing motivational sparks. The system 100 may also be referred to as motivational system 100. The system 100 may comprise at least one server 110 connected through the network 114 with at least one user device 120.

The at least one server 110 may comprise at least one server processor 130, and one or more databases 102. For example, the server may comprise at least one database with user and peer content, at least one database with original content and at least one database with third party content. For example, the third party generated content may be at least one of a video, a picture/image, a text, and an audio recording.

For example, the system 100 may comprise the user device 120, a website, and IoT, VR and AR. For example, the website may provide all functionality and may be able to be responsive for tablet and/or smartphone access.

Figure 2:
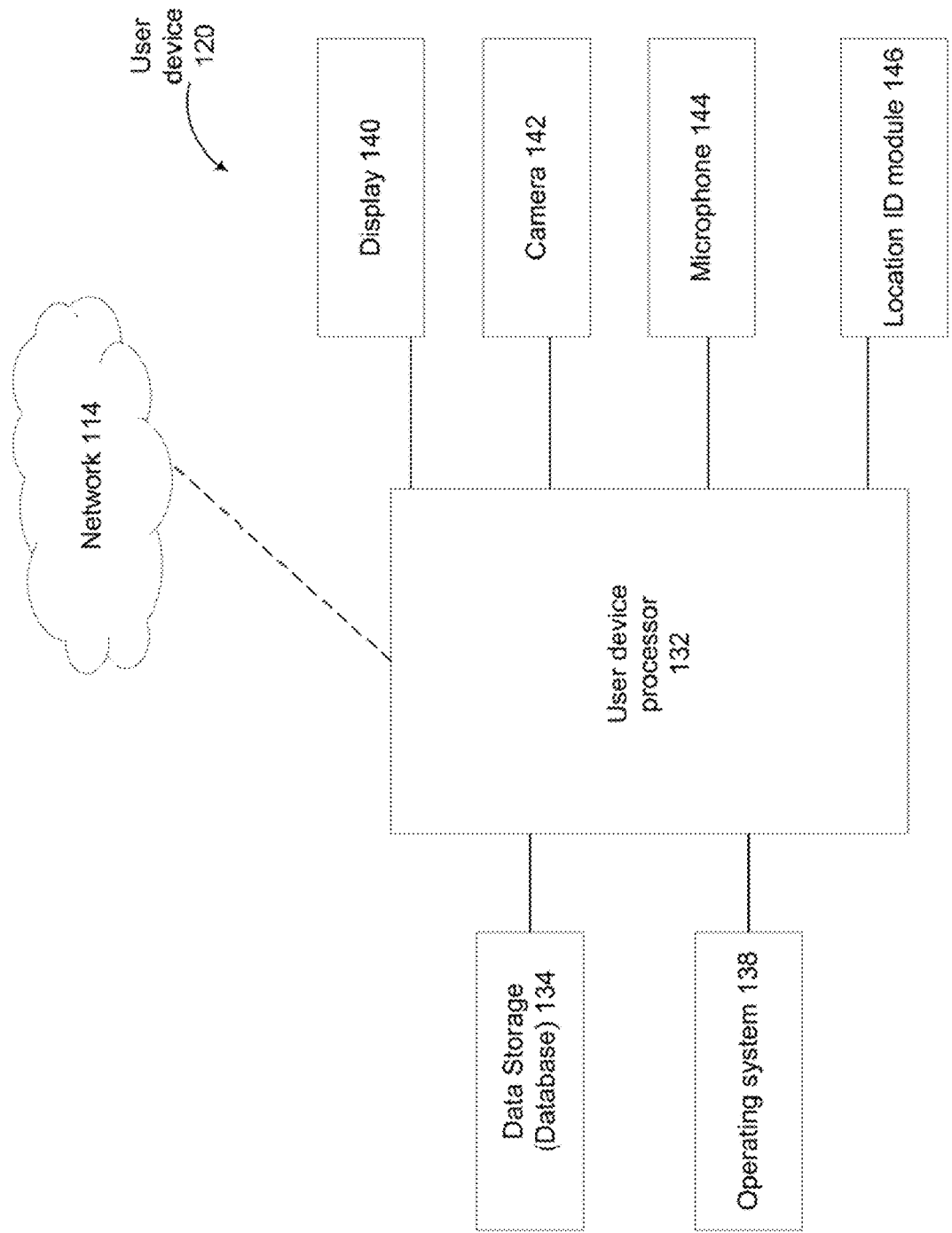
FIG. 2 is a schematic view of an example embodiment of the user device.

Shown at FIG. 2 is an example embodiment of the user device 120, in accordance with at least one embodiment. Each user device 120 may comprise at least one processor 132, at least one data storage 134, and at least one operating system 138. The user device 120 may also comprise a display 140, a camera 142, a microphone 144, and a location identification module 146. For example, the location identification module 146 may determine the location of the user device 120 through triangulation of signals, IP address lookup, or GPS location. The user device 120 may be connected to the network 114 wirelessly and/or by means of a cable.

The user device may be any programmable computer as described herein. For example, a smartphone may be a user device.

In at least one embodiment, the system 100 may request the user to identify a user goal. Some examples of user goals may be quitting smoking, losing weight, eating healthy, exercise, sending friend a joy, feeling bliss. Generally, a user goal is one that may be achieved if the behaviors of the user change.

In at least one embodiment, there may be, for example, one or more of the following types of the user goals, here defined in terms of "desired behaviors": exercise, practicing mindfulness, eating healthy, and remembering a friend. In at least one embodiment, the system 100 determines which contextually-relevant motivational spark, designed to aid user in desired association, should be picked and displayed (e.g. social media support for exercise; inspirational Facebook photos for mindfulness; at least one video for eating healthy; a friend-only video for remembering a friend). The motivational spark may be provided in 'real time', rendered on the user device. In other embodiments, the motivational spark may be cloud-based, to be served at relevant times/contexts.

In at least one embodiment, the user may: go through a 'motivational interview' process to identify and practice a behavior; have the interview recorded 'selfie mode'; define what time the user needs help; and get sent at least one motivation spark, which, for example, may motivate the user to do at least one desired behavior at the desired time.

For example, the system 100 may request that the user visualize and capture/record the user's user goal(s) and/or user behavior steps to achieve them i.e. as motivational imagery. The system 100 may then add peer support and timing.

For example, the system may guide the user to identify relevant first user behavior steps to build to their desired behavioral habits, practice the user behavior steps, capture key images, and then see them again in a novel form that is highly produced, intelligent, and entertaining, and that may include messages from friends and family.

Figure 3A:
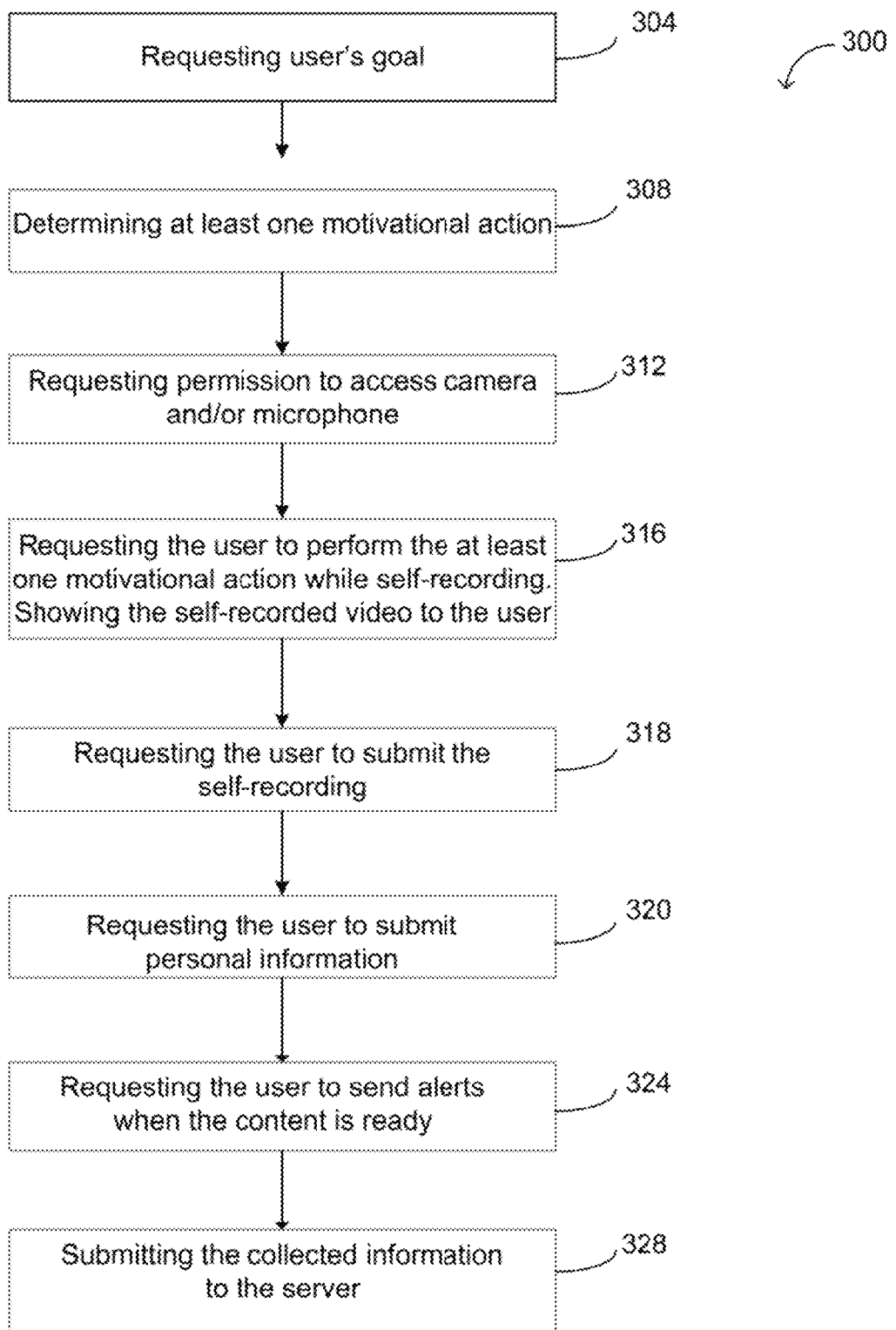
FIGS. 3A and 3B are flow chart diagrams illustrating example embodiments of methods for generating a motivational spark for a user.
Figure 3B:
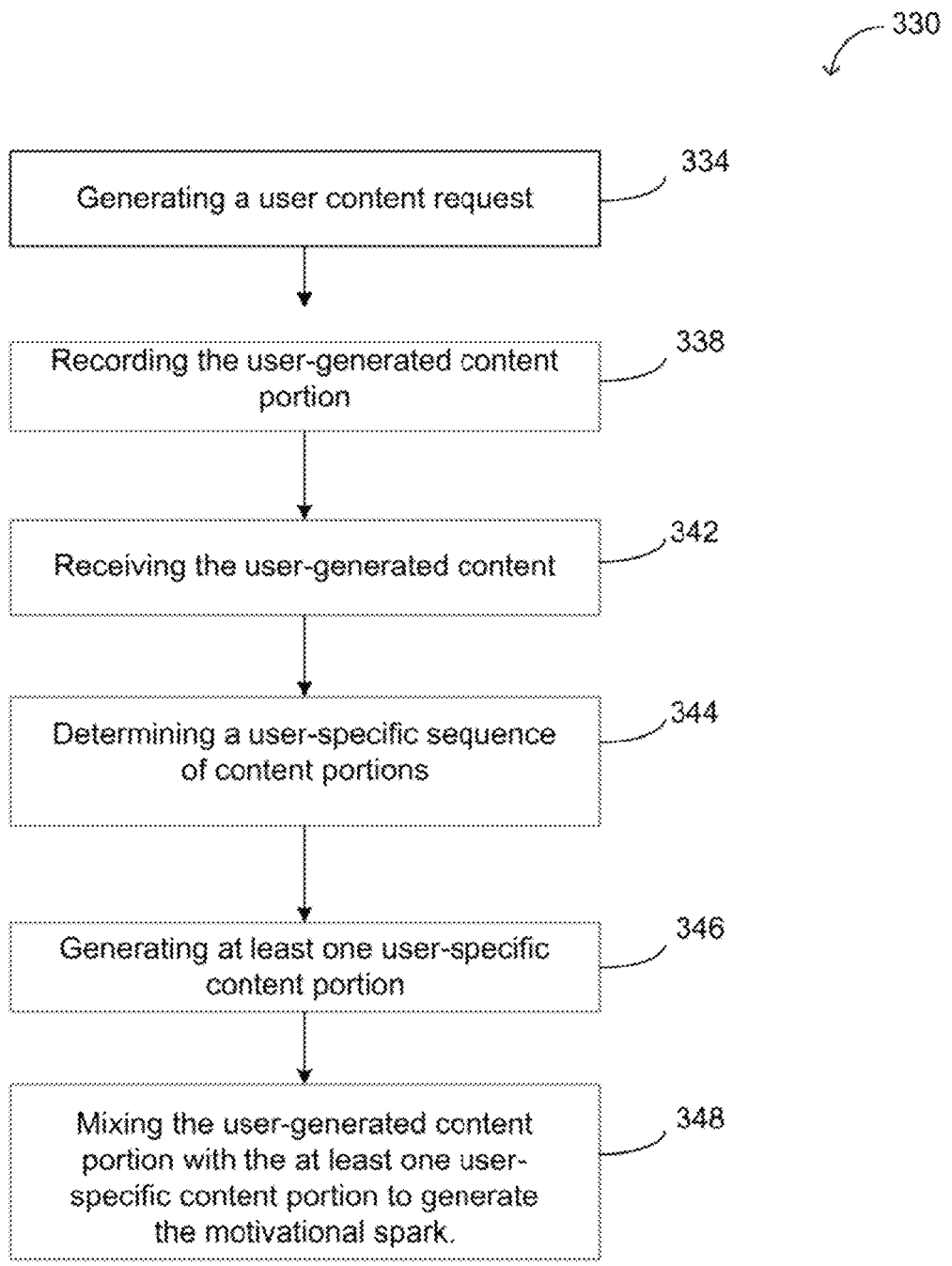

Referring now to FIG. 3A and FIG. 3B, shown therein are example embodiments of methods 300 and 330 for generating the motivational spark. In at least one embodiment, the system 100 may request the user to identify the user goal at step 304 of the method 300 and the user goal may be obtained from the user.

For example, other user goals may be: getting over fear of public speaking, recovering from hip replacement surgery well, getting more organized, finding a new job, and/or enjoying children more. For example, other user goals may be: master Type 2 Diabetes self-care, get over fear of public speaking, get less depressed, get more organized, de-stress, find a new job, enjoy your children more, tame alcoholism, stop smoking, tame drug addiction, tame overeating, wellness for golden years, exercise specific (for example, train for a marathon, design your own), tame arthritis, recover from hip replacement surgery well, save money, sleep healthier, and wake up more alert.

As described herein, the user goal may be, for example, quitting smoking, losing weight, eating healthy, exercise, sending friend a joy, feeling bliss. For example, the user goal may be combating the diabetes. For example, the user goal may be overcoming or adjusting behavior to sustain and/or live though and/or adapt to a long-term disability.

In at least one example embodiment, the system 100 may determine at least one user behavior step. For example, the user may guide the system 100 in determining the at least one user behavior step by providing input on at least one question asked by the system 100. For example, the system 100 may determine the user behavior step based on the user goal and/or user personal information.

For example, if the user goal is to exercise, the system 100 may identify that a first user behavior step is to have the user walking every day for a certain number of minutes. For example, a second user behavior step may be related to the user walking for increased period of time. For example, the last user behavior step may be having the user going to the gym daily.

For example, if the user goal is to learn to live with diabetes or to control the disease, the system 100 may determine the user behavior steps accordingly. For example, the user behavior steps for a diabetics control may be exercising, learning the low-glycemic choices, and buying them habitually.

In at least one embodiment, the system 100 may determine at least one motivational action at step 308. In at least one example embodiment, the motivational action may be based on the user goal. In at least one embodiment, the motivational action may be based on a user behavior step.

Alternatively, the system 100 may propose to the user to identify other motivational actions that may motivate the user to achieve the goal.

For example, one motivational action may be to capture screenshot or photo of playlist the user has lined up for next day of exercise and capture image of planned exercise. Another motivational action may include the user capturing a 'selfie video' describing the positive feelings the user is experiencing just after exercise. For example, the motivational action may comprise picking a local hike on a map and capture a photo of map, and/or to write email to friends inviting them to join on hike. Another motivational action may comprise filming the user doing quick stretches at his or her computer. Another motivational action may be to film the user putting on jogging shoes. Another step may be filming the user clicking on 7 minute workout software application (app) icon. Behavioral steps can be dynamically generated based on user progress and API-accessed data from monitoring devices such as steps counters.

At any time before requesting the user to perform the at least one motivational action or at any time after, the system 100 may request user permission to access the a camera, a photo album, and/or a microphone at the user device 120. For example, the system 100 may request user permission to the access the camera and/or microphone at the user device 120 at step 312, as shown at FIG. 3A.

At step 316 of FIG. 3A (or 334 of FIG. 3B), the system 100 may generate a user content request (selfie-request). For example, the user content request (selfie-request) may comprise prompting the user to perform at least one motivational action while a user-generated content portion (user selfie) is being recorded.

In the at least one embodiment, the user device 120 may then, at step 338 of FIG. 3B, record the user-generated content portion (user selfie). For example, the system 100 may request the user to perform a specific motivational action while the video is being recorded by the user device 120. For example, the system 100 may turn on the camera and the microphone of the user device 120.

For example, the user-generated content portion may be a video and/or audio and/or image of the user performing the motivational action, as requested by the system 100. For example, the user-generated content portion may be a video, an audio recording, and/or an image created by the user to satisfy the motivational action. For example, the system 100 may request the user to film and/or take a picture of her kids playing, or her kids crying. It should be understood that the system 100 requesting the user to perform the motivational action may include filming or taking picture of an object, another person, and/or the user.

In at least one embodiment, the scripting and capture may be done by user device and/or server 110, using the application or via website. User may be scripted to make 'selfie-film' of scripted action. For example, the user may be requested to upload photo of what the user wants avoid at a coffee shop and what alternative food/beverage choice the user wants to choose instead (e.g. at Starbucks, replace sugar-filled Caramel Latte and replace it with lightly sweetened tea). In another example, the user may be requested to film a number (e.g. five) of alternative behaviors instead of smoking and the system 100 may provide suggestions for user, such as playing Tetris, chewing gum, sucking lollipop, punching pillow and saying 'I did it!'.

For example, the user may be asked to film himself or herself pretending to smoke and then pretending to throw-up. For example, the motivational action may include filming a list of healthy things to buy at the grocery story that are low-glycemic, or filming a list of unhealthy things the user typically buys and show herself crossing them off, or drawing happy face and A+ or filming list of 5 funny movies to watch. For example, the motivational action may include filming the user standing in 'power pose' in doorway and/or filming herself/himself covering face with hands and/or filming the user taking a deep breath and smiling and/or filming the user getting in bed and closing eyes with slight smile and/or filming the user waking up with a smile saying "I'm ready".

At step 318 of FIG. 3A, the system may request the user submit the user generated content. At step 342 of FIG. 3B, the system may receive the user generated content.

For example, the user device 120 may submit the user-generated content portion to the server 110. For example, after recording of the user-generated content portion, the system 100 may request the user device 120 to transmit the recorded user-generated content portion to the server 110. The user-generated content portion may also be transmitted automatically to the server 110. The user device 120 may also store the user-generated content portion on personal database 122 of the user device 120.

In at least one embodiment, at any time before requesting the user to perform the at least one motivational action or at any time after that request, the system 100 may request that the user submit user personal information. For example, the system 100 may request that user submit user personal information at step 320, as shown at FIG. 3A. For example, the user personal information may comprise at least one of a gender, race, age, location, relationship status, if they have children, if they have pets, how much weight they would like to lose, if they smoke, what medical conditions they have, what type of music they like, what outdoor scenes they prefer, their favorite brands, their favorite foods, their favorite choices of transportation, what they feel are their worst traits, what they feel are their best traits, what they think others love most about them, what they think stops them from achieving their dreams, if they are extroverts, if they enjoy travel, where they would most like to be, their ideal vacation, their favorite way to rest, their favorite game, their ideal date, their ideal meal, what scares them most, and third party data access for additional data (such as Spotify, Facebook, Amazon, Pinterest, Twitter).

In at least one embodiment, the user personal information may modify at least one user behavior step and/or at least one motivational action and/or the selection of the third party generated content.

At any time before requesting the user to perform the at least one motivational action or at any time after that request, the system 100 may request the user to specify when the user would like to receive an alert that the motivational spark has been generated by the system 100. For example, the system 100 may request when the user would like to receive alerts at step 324 in FIG. 3A.

In at least one embodiment, the system 100 may request the user to specify if and when the user would like the system 100 to send alerts when the motivational spark is ready.

In at least one embodiment, the information collected from the user, such as, e.g. the user personal information and motivational spark schedule information may be sent from the user device 120 to the server 110 (step 328 at FIG. 3A). For example, this information may be stored at the server 110, or at the user device 120, for future reference. For example, the user personal information may be used by the system 100 in determining the user behavior steps and/or in determining of the motivational action. For example, the user personal information may be used by the system 100 to determine a user-specific sequence of content portions, as described herein, and/or defining which third party generated content to use in the motivational spark, as described herein.

In at least one embodiment, when the user is a returning user (the user has already used the system at least once), the user may not be asked for a permission to use the camera and/or the user may not be asked to enter the user personal information and/or to enter some other information.

Referring now specifically to FIG. 3B, steps 334 (generating a user content request) and 338 (recording the user-generated content portion) have been described above.

At step 342, the system 100 may receive the user-generated content portion (user selfie) from the user device 120. At step 344, the system 100 may determine a user-specific sequence of content portions.

At step 346, the system 100 may generate at least one user-specific content portion based on user personal information and/or the user-specific sequence of content portions. User-specific content portions may be imagery and/or video and/or effects and/or text and/or audio selected from original content (e.g. user-generated content portions, peer-generated content portions) and/or third party content (e.g. third party generated content).

For example, the user may interact with the system 100 via time/context sensitive messages on screens (and/or via IOT objects) and/or via the mobile and/or web apps where they create and manage their motivational sparks or create and manage social support.

At step 348, the system 100 may generate a motivational spark. A motivational spark may be generated by mixing one or more user-generated content portion(s) and user-specific content portion(s). The motivational sparks may comprise at least one content portion. In at least one embodiment, each content portion may be one of: a user-generated content portion, a third party generated content portion, a peer-generated content portion, or other content portion.

Generally, to generate motivational sparks, the system 100 may request and may receive user-generated content portions, may request and receive third party generated content portions (such as, e.g. social media and/or licensed content). The system 100 may also find the content portions on a hard drive of the mobile device and/or download them. Selecting of the content portions for each motivational spark may depend on different types of the user goals (exercise, clean/mindfulness, eating well), user's preference provided e.g. with user personal information, and other criteria.

The motivational sparks may be assembled based on various criteria, such as, for example, time-related criteria (time of the day, month, etc.), user preference, desired length of the motivational spark (suggested, adjusted, or calculated), length of peer support video (or peer-generated content portion), length of content portions, pacing of music/audio, desired pacing of cuts between each content portion, content of the text messages, and type of the calls for action.

In at least one embodiment, the content portions may depend of the physical data. For example, if the system has collected information on the weather, and this information includes rain, the system may use the indoor imagery. In another example, if the information collected by the system from a step-counter shows that the user has already walked more than a certain number of steps, then the system may request the user to do yoga as a next motivational action.

The user-generated content portions may include motivational selfie-videos. The selfie-videos may be requested and collected from the user by the system 100 using the following steps: sending a request to the user to choose a goal from a list of goals (such as quitting smoking, losing weight, etc.); receiving the user's goal; based on the user's goal, choosing or generating or determining a sequence of actions to achieve the goal; sending a request to the user to record at least one video performing at least one action (selfie-video) from the abovementioned sequence of actions; receiving the at least one selfie-video; storing the at least one selfie-video. In at least one embodiment, the next selfie-video step may be requested by the system at the user device.

A request for the at least one selfie-video may be done by e-mail, app push alert, or text or other communication means. The request may include an explicative video or a link to a website. Alternatively, the request may be scheduled automatically by the system 100. The requests may also be scheduled by the user. For example, the system 100 may propose the user to schedule the requests. Alternatively, the system 100 may send the requests randomly. For example, the system 100 may request the user-generated content portion and automatically store the user-generated content portion on the system 100 server 110 and/or user device 120.

The system 100 may request the user to perform an action, record the performance, submit/upload video (e.g. selfie-video), one action at a time. For example, the system may automatically save and/or upload video to the server. For example, only after a first video has been uploaded by the system 100, the system 100 may send a second request for a second video. Alternatively, the system 100 may invite the user to perform several actions at a time, record them and upload to the system 100.

For example, the system 100 may request the user to make 'selfie-film' of scripted action. For example, the user may be requested by the system 100 to record a photo and to upload photo of what the user may want to avoid at a coffee shop.

In at least one embodiment, the system 100 may request the user to register (e.g. via FB, twitter, Google+) and may propose to the user to modify the following: account management; a choice of at least one motivational trigger types (exercise, clean, eat well); visualization script/capture; a choice of time(s) and day(s) to receive reminder(s); spark management; saved sparks; 'visualization board'; user content library management; send spark to friends; add 'social support'; social support queries Facebook or G+ graphs if registered through them OR ask to email directly. The system 100 may also comprise progress tracker and displaying a congratulations message.

In at least one embodiment, the user may provide, on request of the system 100, at least one smart phone number and what time or times of day he or she seeks motivation. Providing the phone number may facilitate the delivery of, e.g., SMS messages and/or inspirational phone calls.

In at least one embodiment, the system 100 may comprise phone lock and/or betting system to exploit the user's loss aversion. For example, the user may wager that the user can go without smoking for 3 days. If the user should fail to do this, the mobile device may lock out the user for a period of time (e.g. one evening). Alternatively, a similar system could be implemented in the absence of a wager; the mobile device may simply lock out the user for failure to achieve a goal.

For example, the user may be asked for approval of Terms and Conditions; permission to access photos; permission to access camera; permission to access microphone; permission to access contacts; permission to send push notifications. For example, this information may be stored in the user's account.

For example, the system 100 may require the user to enter the following information: first name; Email; password, and optionally, phone number. For example, the user may register via Twitter, Facebook, and/or Gmail.

The motivational sparks may be scheduled, delivered to, and played on a user device at specific time. For example, the motivational spark may be delivered via SMS and/or email.

For example, the information on user goal and desired behavior, phone numbers and time of delivery of the motivational spark may be collected via email. For example, the phone number and time preference may be collected using an application installed on the user device (e.g. a web or phone app).

In at least one embodiment, the system 100 may generate the motivational sparks by mixing (mashing) various content portions as described herein. Mixing, mashing, or mashing up various content portions may, generally, include editing, splicing, cutting, cropping, overlaying, sequencing, and/or appending one or more content portions to produce a motivational spark.

Each motivational spark may be generated as an assembly of content portions of audio recordings (e.g. songs, voice recordings), images, video, or text messages.

The motivational spark may be generated by combining user-generated content portions, social media content (e.g. friends' support videos) and/or licensed and featured third party content.

The motivational spark may be personalized time-based media content that is sent to a user device in order to trigger a specific user's behavior.

Figure 4:
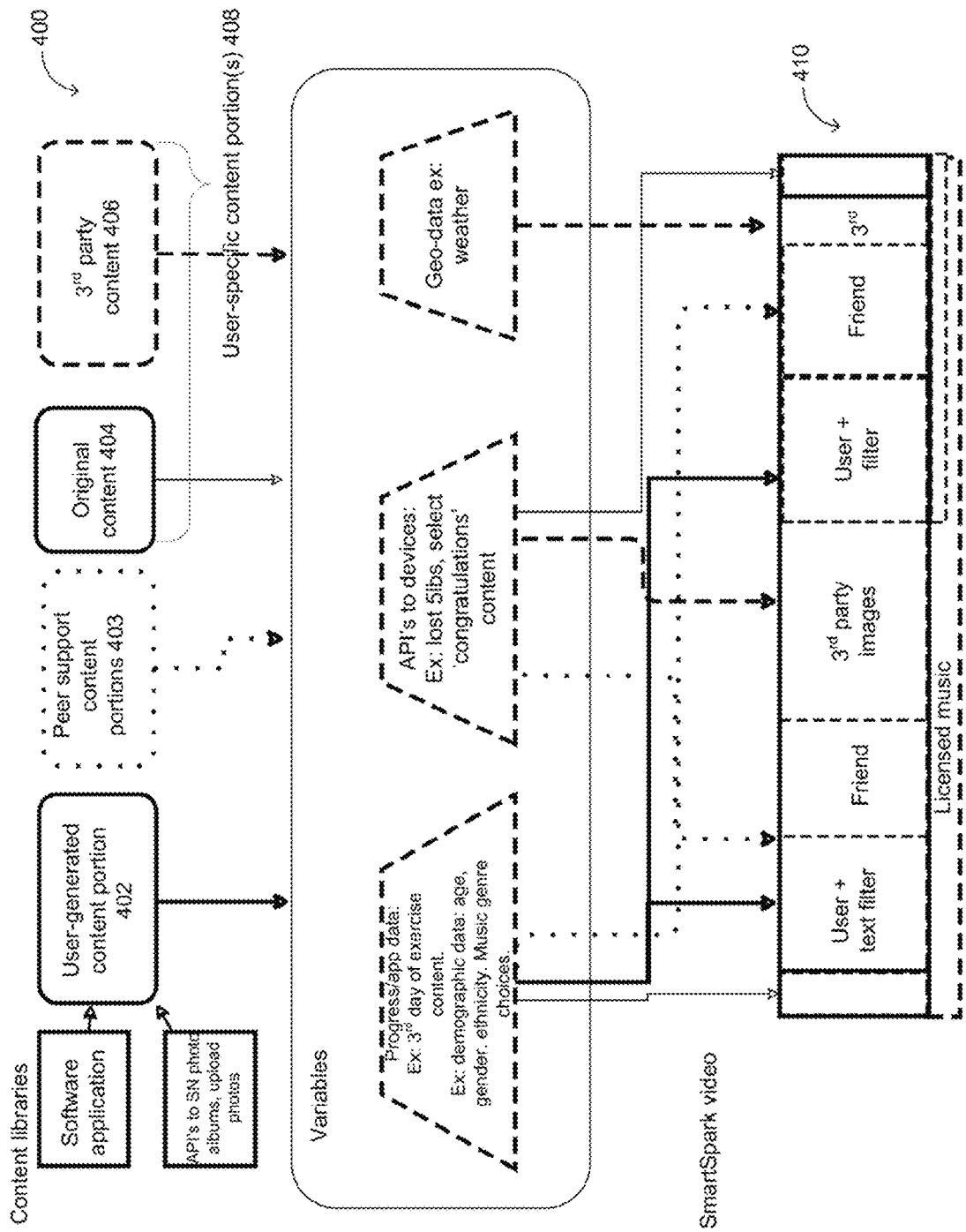
FIGS. 4 and 5 illustrate schematic views of motivational sparks, in accordance with at least one embodiment.
Figure 5:
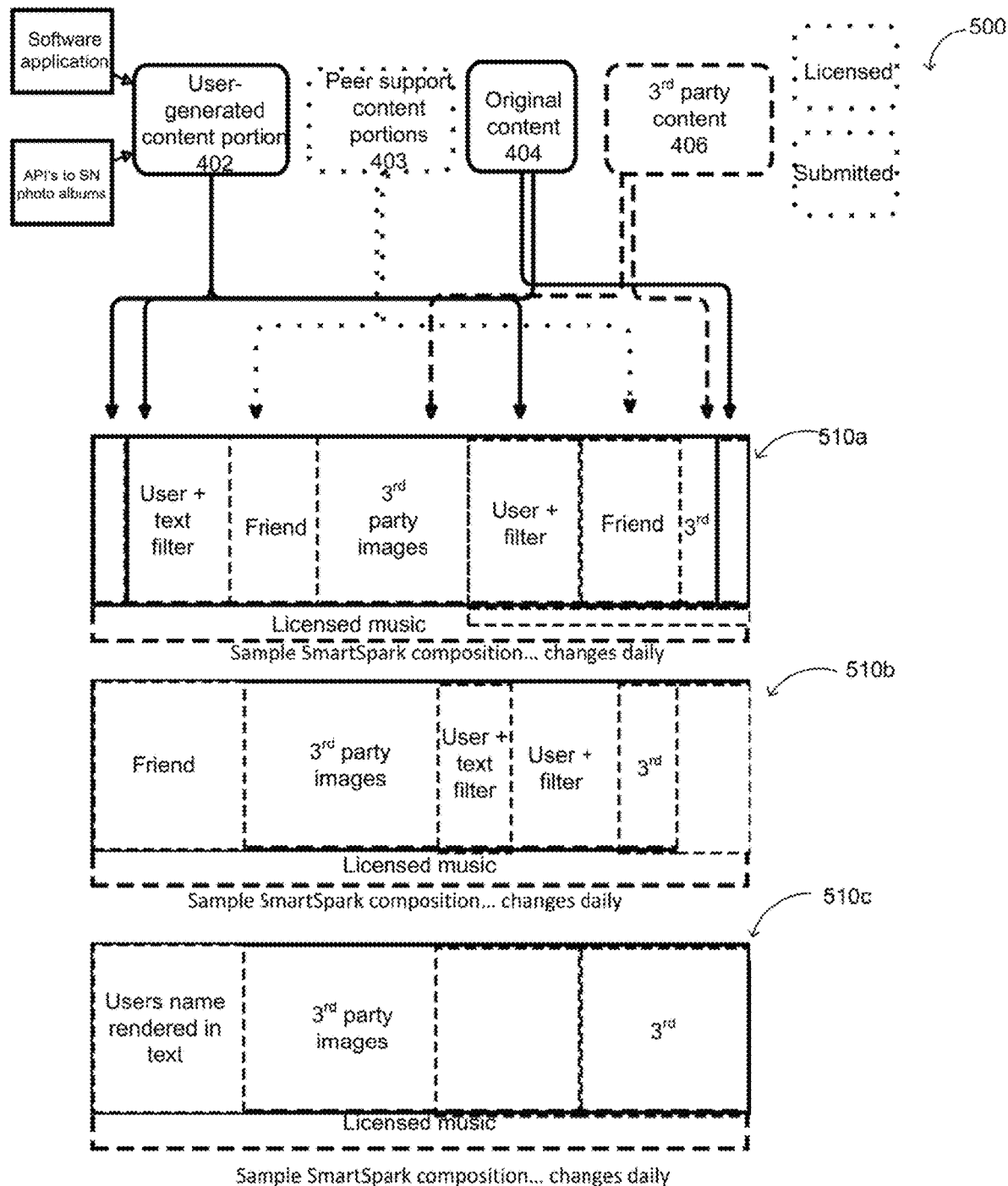
Figure 6:
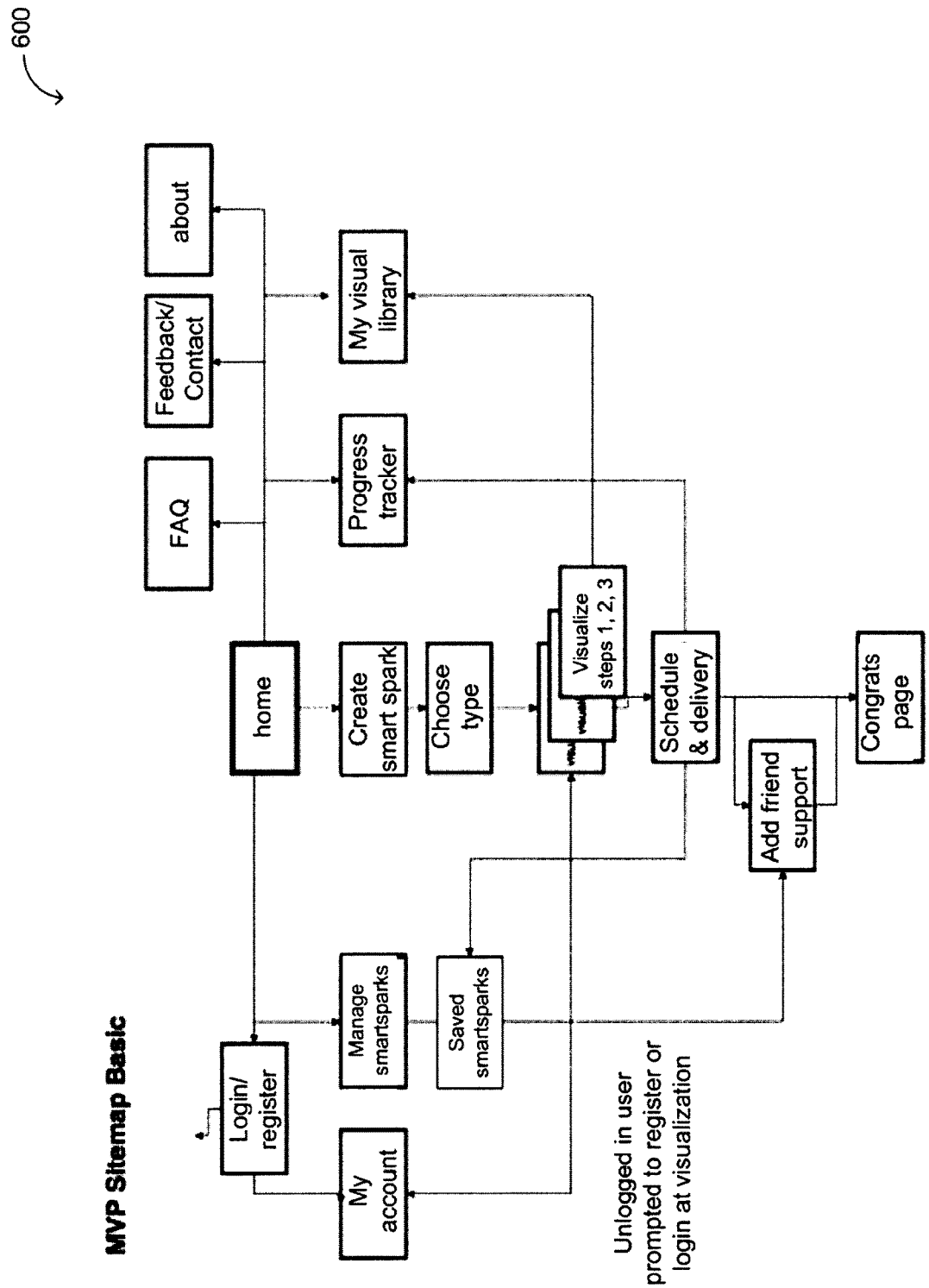
FIGS. 6, 7A, 7B and 7C show a schematic view of a site map for a graphical user interface (GUI) provided by the system 100, in accordance with an embodiment.
Figure 7A:
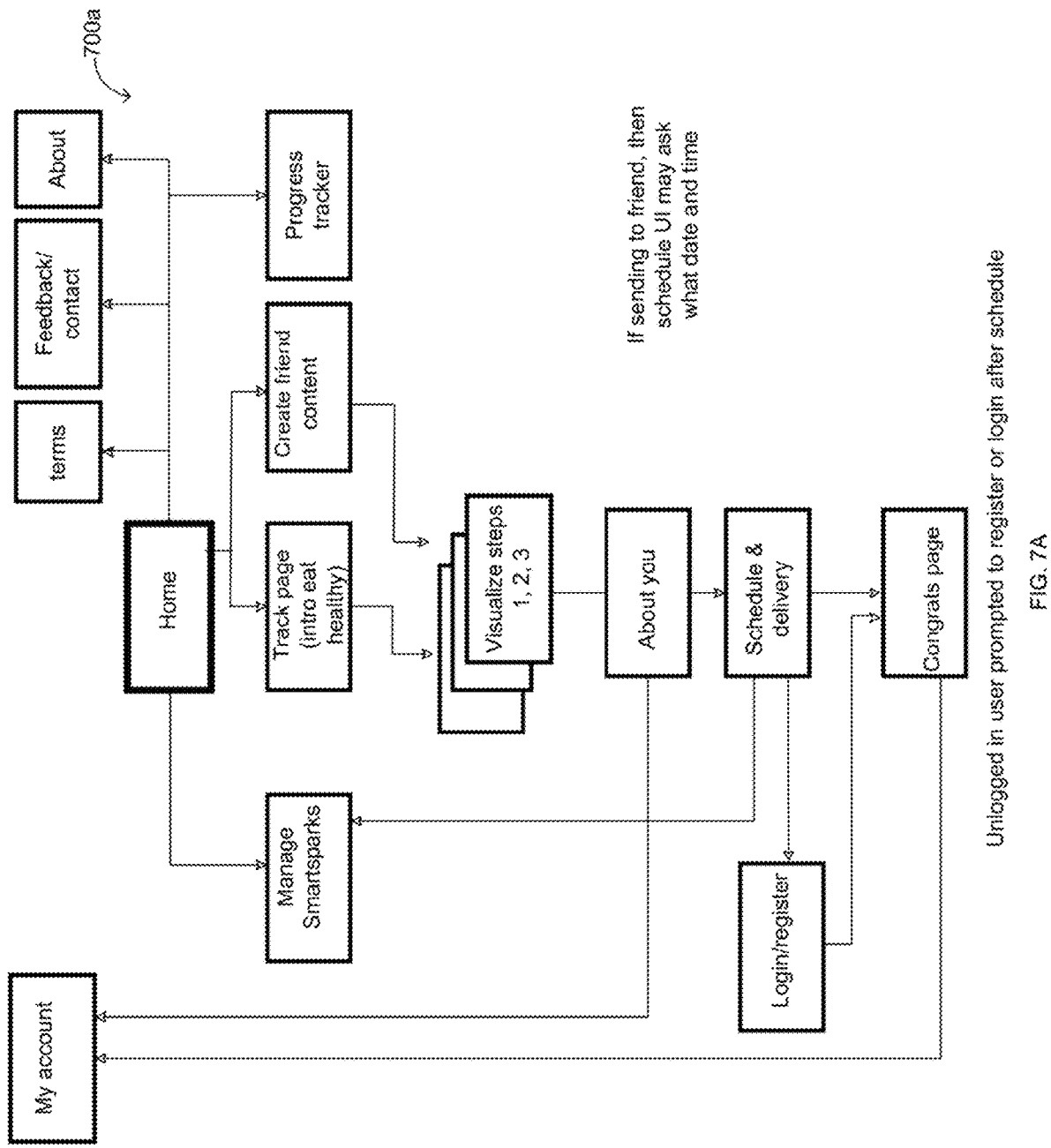
Figure 7B:
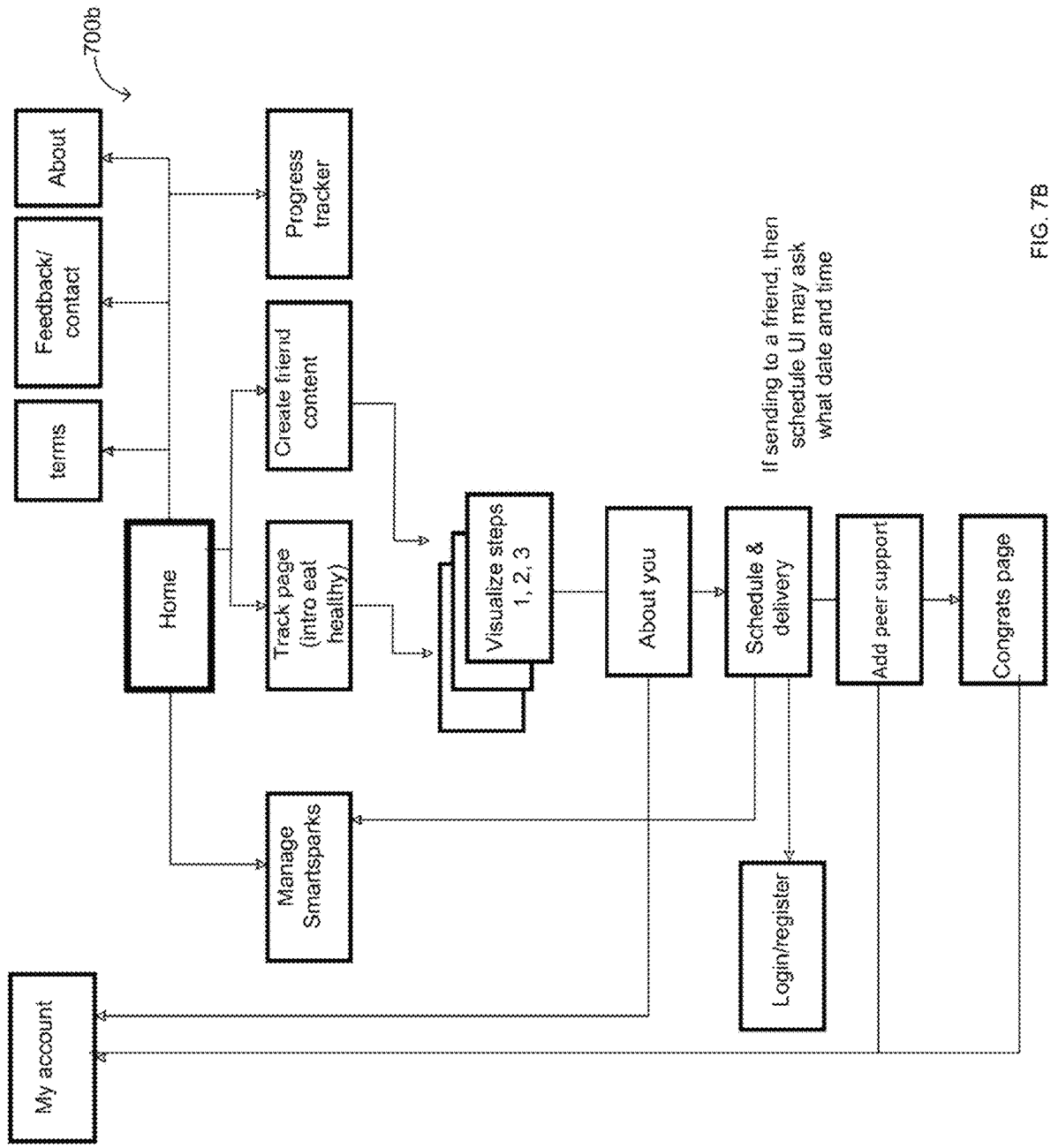
Figure 7C:
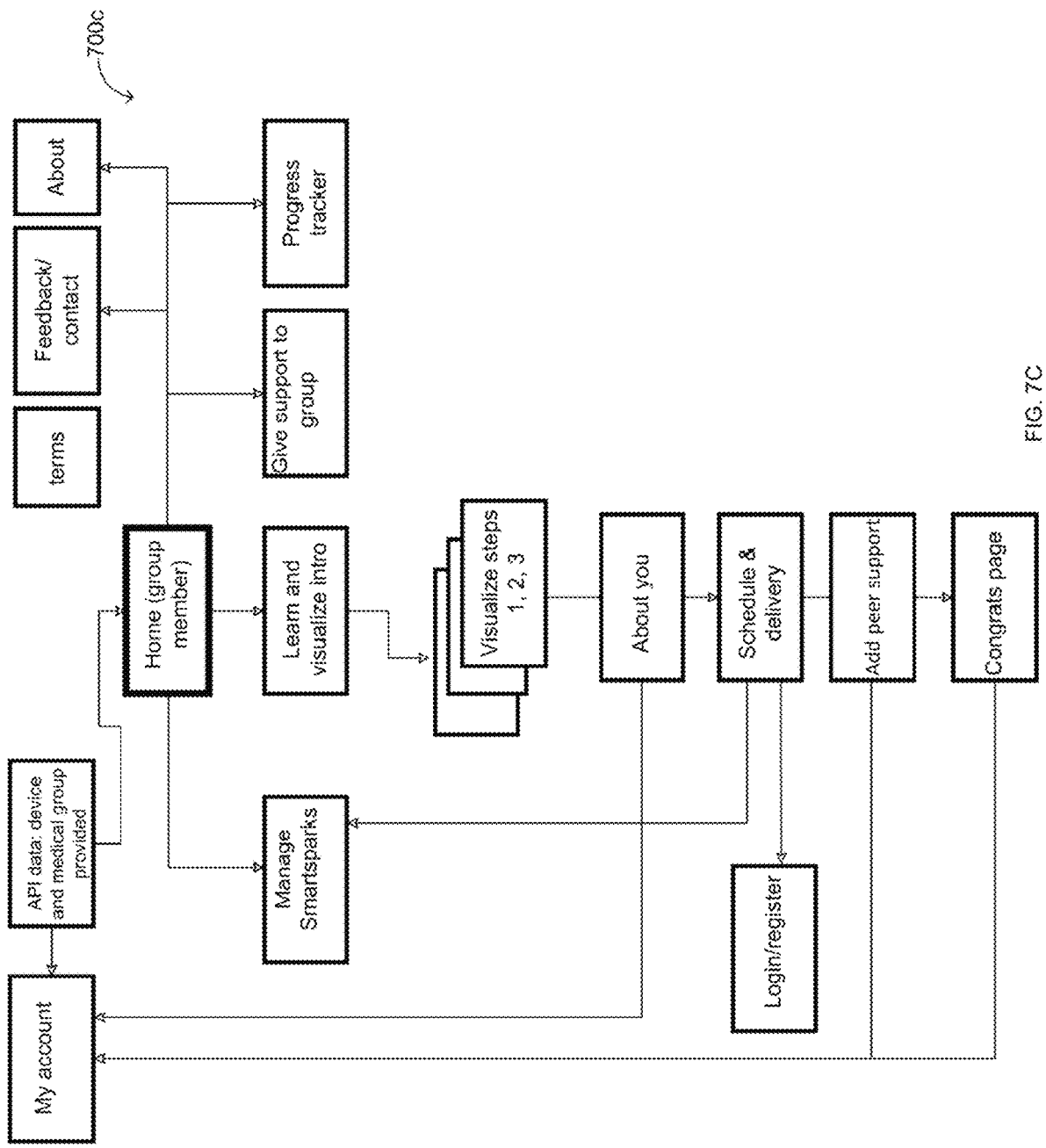

Referring to FIGS. 4 and 5, shown therein are schematic views of embodiments of the motivational sparks 410, 510a, 510b, and 510c. Shown therein are also the content portions of the motivational sparks.

The motivational sparks may be generated by combining user, friend and proprietary video/imagery that may change over time.

At chosen time, location and/or user device, the motivational spark may be received for the purpose of triggering the desired user behavior. In at least one embodiment, the motivational sparks are always new, insofar as each motivational spark is not a motivational spark that any user device has received before.

In at least one embodiment, the user may see his or her progress and may add at least one new video (or any other user-generated content portion) to their unfolding story.

Referring now to FIG. 4, shown therein is a schematic view of a motivational spark 410, in accordance with at least one embodiment. In at least one embodiment, the motivational spark 410 may be generated by mixing, by the system 100, the at least one user-generated content portion 402 with at least one user-specific content portion 408. For example, the user-specific content portions 408 may be imagery and/or video and/or effects and/or text and/or audio selected from the original content 404 and/or third party content 406. The user-specific content portions 408 may be determined based on the user personal information, requested and obtained from the user by the system 100.

In at least one embodiment, the motivational spark 410 may be generated by mashing (mixing, compilation) user-generated content portions 402 and/or peer support content portions 403 and/or user-specific content portion (e.g. the third party generated content 406 and/or original content 404). The motivational spark 410 generated by such mashup may comprise an overlay of imagery and/or video and/or effects and/or text and/or audio.

The motivational sparks 410 may be generated at the server 110. For example, at least one motivational spark 410 may be generated at the user device 120, while the other motivational sparks 410 may be generated at the server 110. As the required motivational spark may change with time, location, user behavior step, etc., the content portions may need to be refreshed, updated, and/or mashed up at the server 110 to form new motivational sparks. In some embodiments, the motivational spark 410 may be updated with new content portions.

The amount of processing/mashing up done on the user device versus on server 110 may depend on the processing and storage capacity of the user device, availability of background app processing, and network connectivity variables.

The user-specific sequence of content portions (the mashup sequence) may be determined by the system 100 based on at least one variable. For example, the at least one variable may be progress data and/or geo-data/physical data (e.g. location, weather) as discussed herein. For example, the user-specific sequence of content portions may be determined by the system 100 based on user personal information (e.g., age, gender, ethnicity, music genre choices, etc.). The user-specific sequence of content portions may determine the way the content portions (e.g. video and/or text and/or music and/or third party images/video) may be arranged. This is based on many factors and may be changed depending on user personal information (characteristics and/or preferences), time, location, etc.

In at least one embodiment, the user-specific sequence of content portions may be determined based on optimization criteria. For example, the optimization criteria may comprise at least one of a time-related criteria (time of the day, month, etc.), user's preference, length of motivational spark (suggested, adjusted, calculated), length of peer-generated content portions, pacing of music, pacing of content portions, user feedback, and feedback on user physical state.

For example, the feedback on user physical state may be requested and/or obtained by the system 100 from the user, the user device 120 and/or other devices connected to the user device 120 and/or the server 110, and/or devices implementing Internet of Things (IoT) protocols, virtual reality, or augmented reality. For example, the user feedback on the motivational spark may be requested by the system 100 at any time after the motivational spark has been displayed to the user by the user device 120.

For example, the user-specific sequence of content portions (the user mashup sequence) may have data on how long should the video portions of the motivational spark be, how fast the text messages should be shown, how many text messages should be included in the motivational spark 410, etc. For example, the user-specific sequence of content portions may have data on a particular sequence of the portions of the motivational spark within the motivational spark, such as whether user-generated content portion has to come first/last or at a certain moment of the motivational spark, whether peer support content portion has to come before or after the user-generated content portion.

Referring now to FIG. 5, shown therein are three different motivational sparks 510a, 510b and 510c generated for the user, in accordance with at least one embodiment. For example, different motivational sparks (such as 510a, 510b and 510c) may be generated and depend on the user and his or her user personal information, his or her user goal, the user behavior step he/she is at, geo-data (location, time of the week, day, weather, etc.), and availability of peer support content.

For example, the user may be asked to access device photo album, to access social network (SN) photos and/or to upload specific types of images. For example, the user may be asked to upload at least one picture of the people the user loves most or, e.g., upload picture of dream outfit that the user would like to wear if the user was in ideal shape.

In at least one embodiment, users may record at least one video and/or image(s) and/or note(s) of support to peers. This can be in-network or through social networks (SN) like Facebook or web page. In at least one embodiment, peers may be requested to record and send supportive video messages to the system 100 in-network from any device, or through social networks such as Facebook, Instagram, and/or Snapchat. For example, the user may initiate recording of the peer support video message (peer-generated support content) for his or her peer. For example, the system 100 may collect peer-generated support content. For example, the system 100 may automatically use the peer-generated support content for a specific user when generating the next motivational spark.

The system 100, in one embodiment, may provide peer instructions to record an answer to a specific question. For example, the system 100 may ask peer to record what superhero their friend would be if they were a superhero. Additionally, the system 100 may provide the peer a scripted behavior to record. For example, the system 100 may ask the friend to record him/her taking a deep breath and smiling.

For group networks, users may be asked to send a supportive message to the rest of the peer group. For example, a Type 2 diabetic may be asked to record an answer to the question: "What is your favorite low-glycemic dessert?"

In at least one embodiment, friends may initiate generation of a supportive motivational spark and/or send a motivational spark or motivational sparks to a user of the system 100 and/or a non-user. In other embodiments, users may not be required to have peer support.

For example, the system 100 may comprise a database permitting the users to communicate.

For example, a first user of the system 100 may send to a second user of the system 100 a newly generated motivational spark. For example, the first user (peer) may record a peer-generated content portion that may be used by the system 100 to generate the motivational spark. For example, the system 100 may request the peer to perform a specific peer-motivational action and to record at least one peer-generated content portion. The system 100 may then use these peer-generated content portions when generating the motivational spark to be sent to the user.

For example, the user may invite peers to support them by inviting at least one other user and/or non-user of the system 100 and/or inviting peers via a social network (such as, for example, Facebook, Instagram) and/or email.

For example, the system 100 may send to a user's friend a request prompting the user's friend to record a peer-generated content portion by performing a specific motivational action. (For example, the invitees may download the software app to provide support or the invitee that uses responsive-web module may upload support videos. For example, the user who is within the social network may provide the support.)

FIGS. 6, 7A, 7B, and 7C show schematic views of site maps describing a graphical user interface (GUI) provided by the system 100, in accordance with at least one embodiment.

Figure 8:
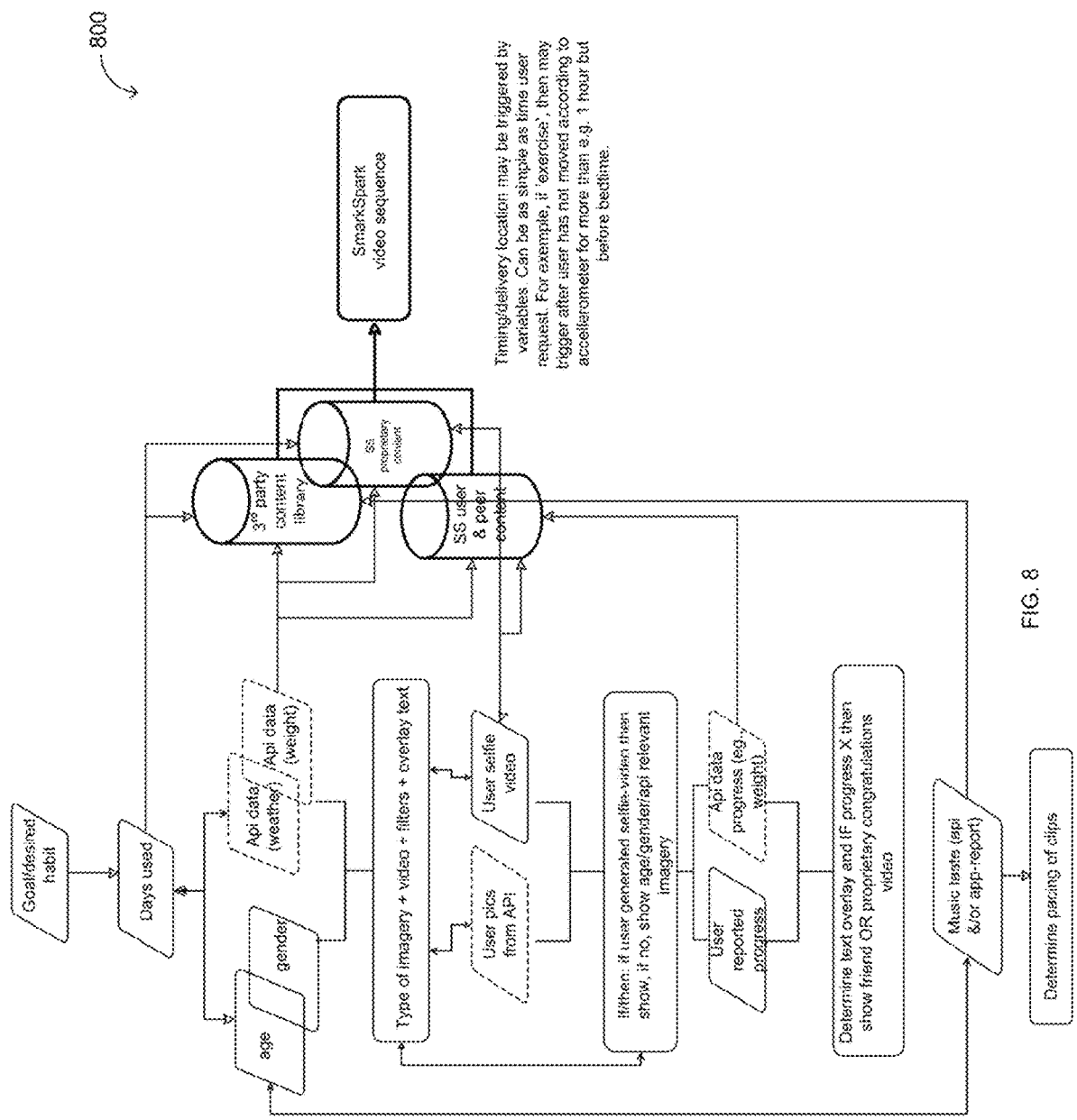
FIGS. 8, 9A, 9B and 9C illustrate flow chart diagrams of methods for generating a motivational spark for a user, in accordance with at least one embodiment.

FIG. 8 show a schematic view of an example method 800 for generating motivational sparks for the user, in accordance with at least one embodiment.

Figure 9A:
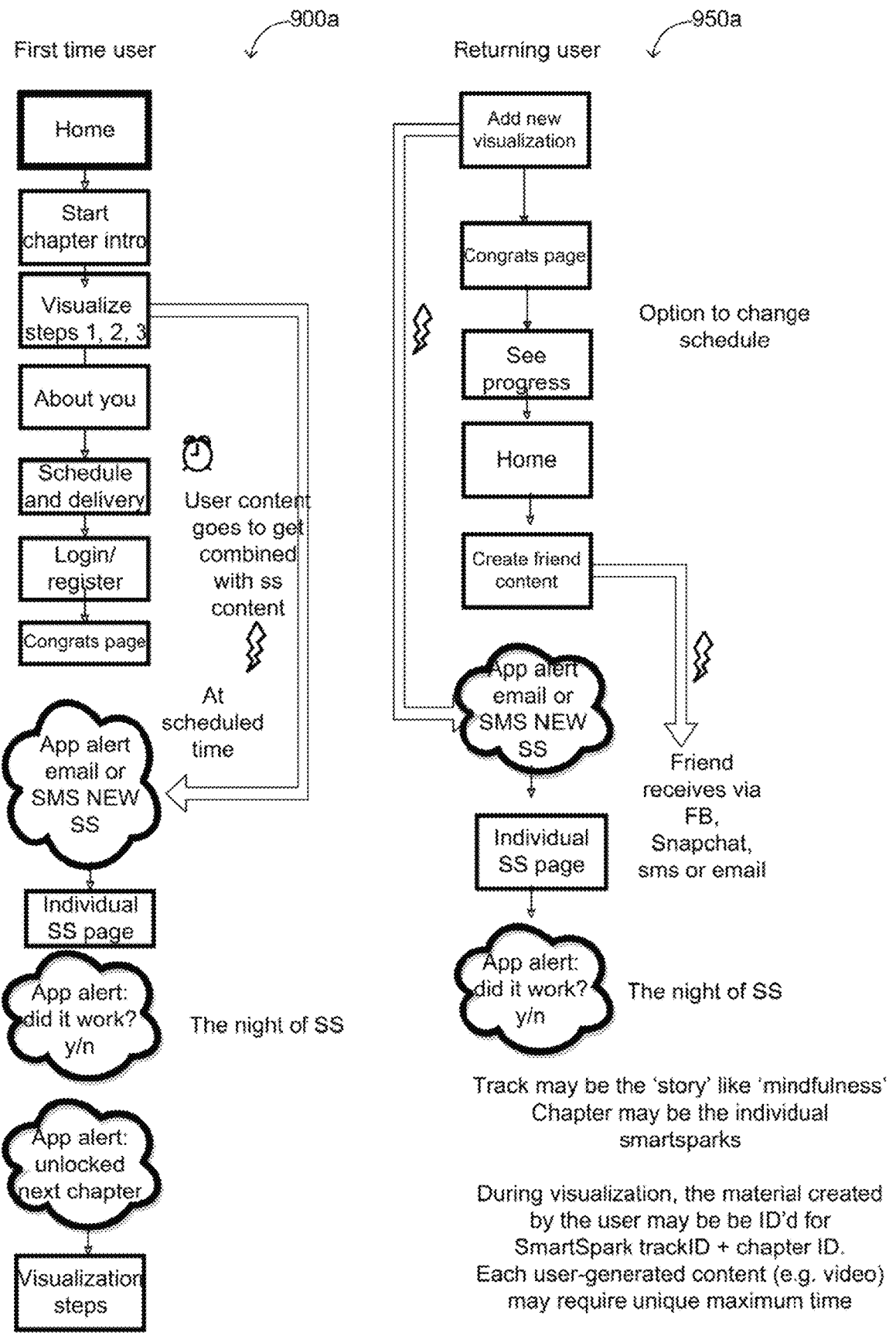
Figure 9B:
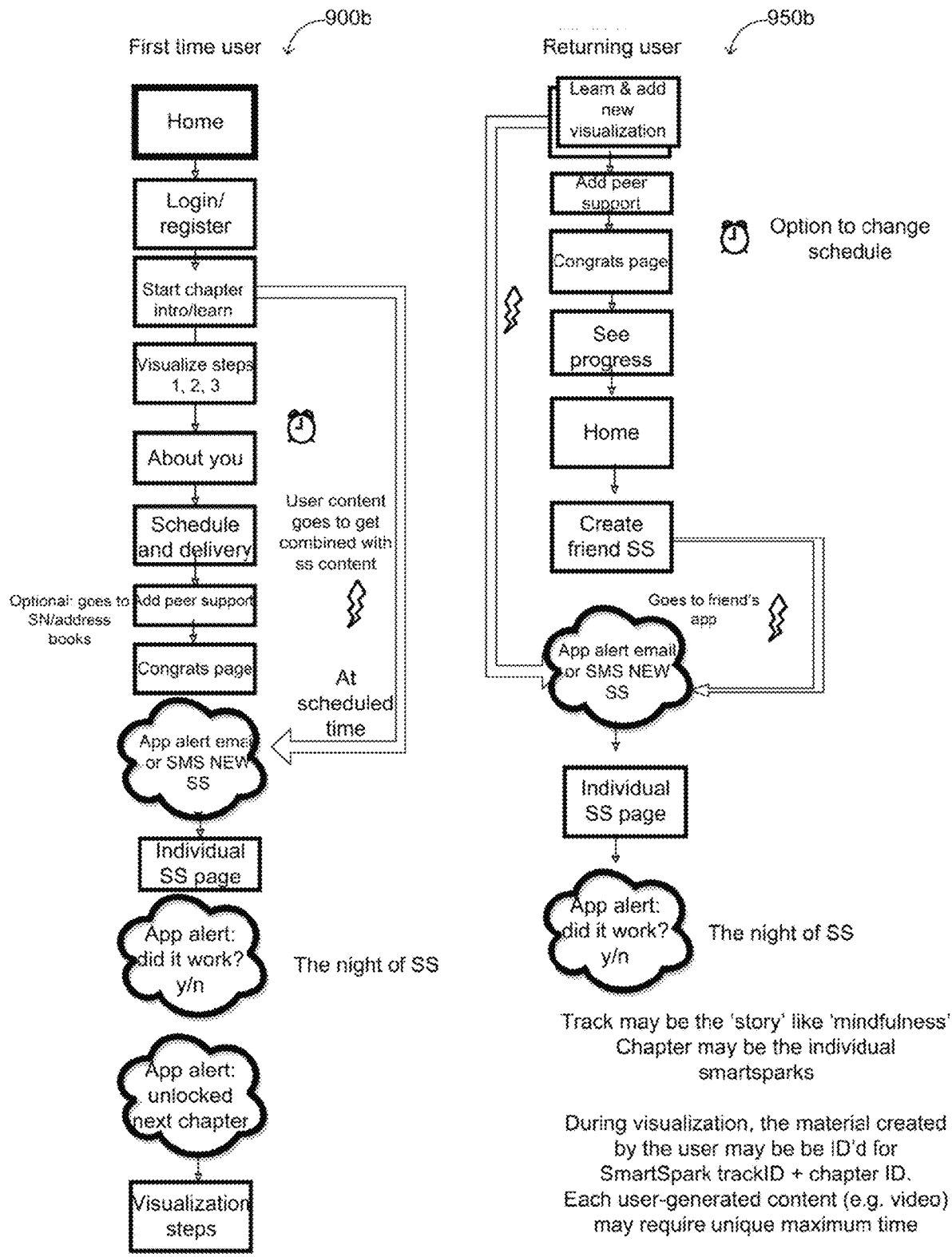

FIG. 9A shows a flow diagram of an example embodiment of a method for using system 100. FIG. 9B shows a flow diagram of an example embodiment of a method with peer-support.

In at least one embodiment, a plurality of users may be medical group participants. The medical group participants may receive and may be prompted to provide group peer support. For example, a medical group participant may not have to 'invite' or ask for support to receive peer support in order to within their motivational sparks. For example, the system 100 may prompt the user to record a specific peer support piece. For example, the system 100 may request: "tell newly diagnosed friends what helped you the most the first week". Group participants may also solicit outside peer support with same user interface as a typical user.

Figure 9C:
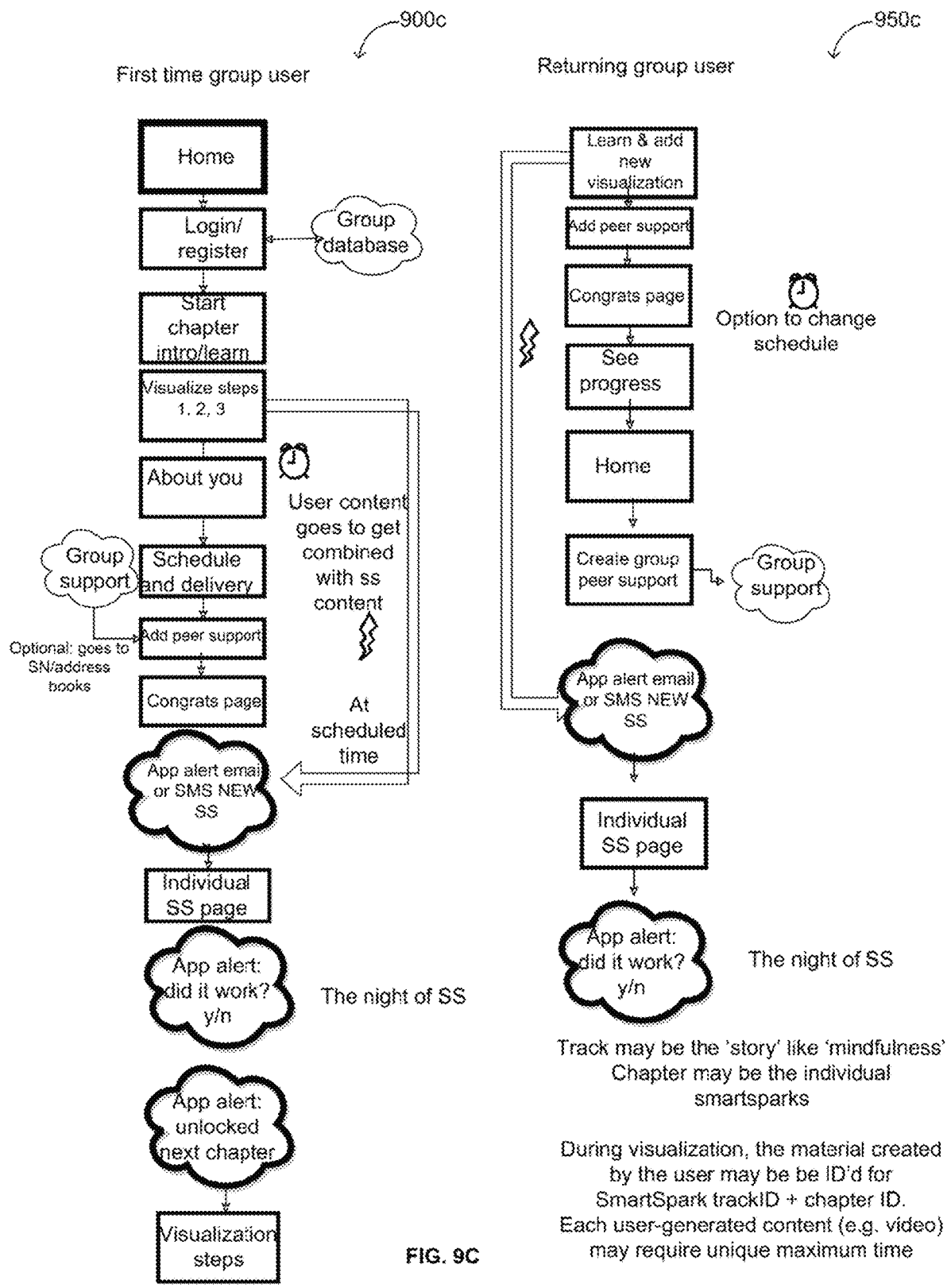
Figure 10:
FIGS. 10 and 11 illustrate example implementations of methods for generating a motivational spark for a user, in accordance with at least one embodiment.
Figure 11:
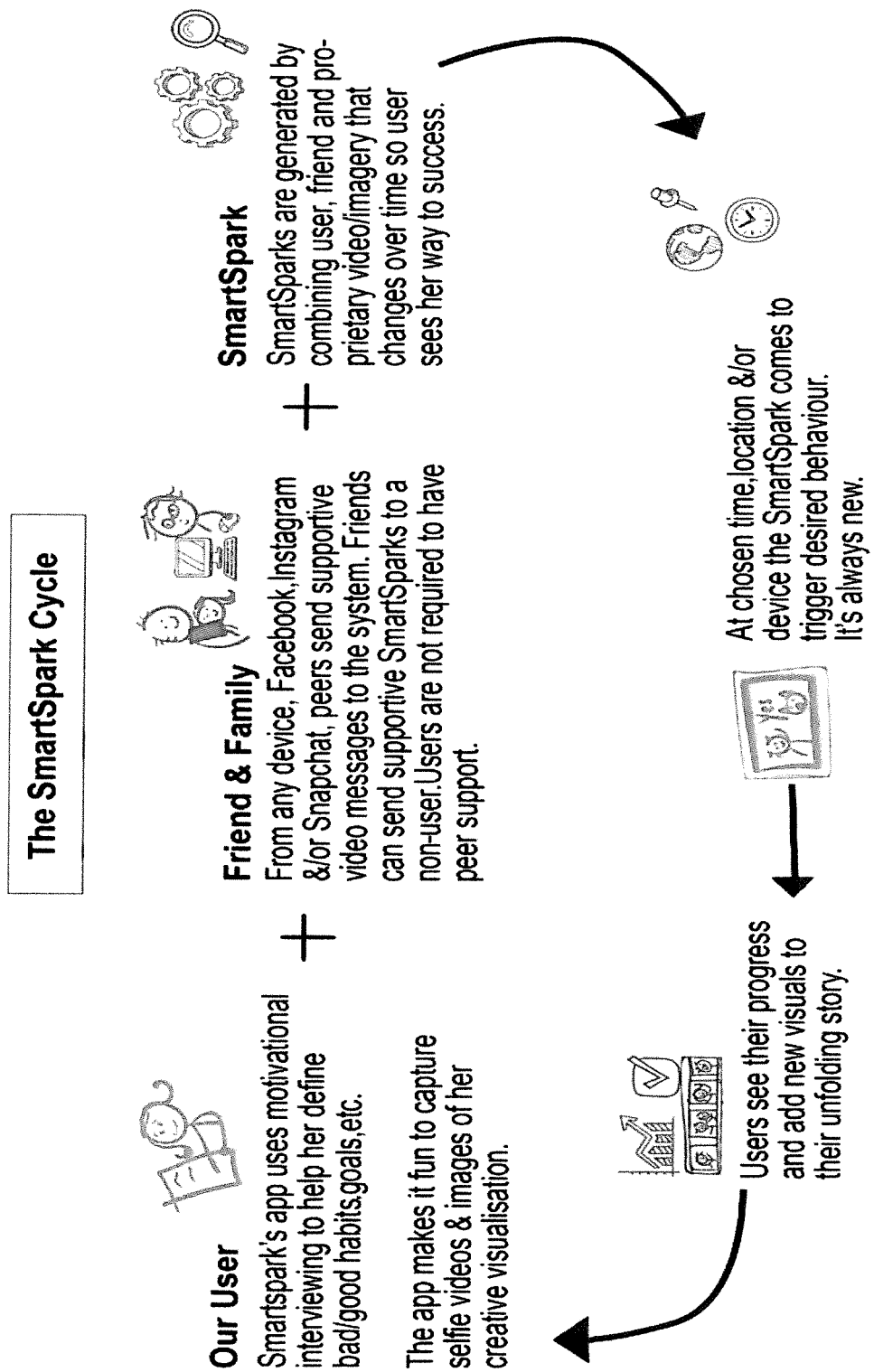

FIG. 9C shows a flow diagram of an example embodiment of a method for a first time and returning group user.

In at least one embodiment, users may add videos to network via in-app or email submission of "tips" or moments of joy. Videos may be reviewed and added to database with appropriate tags.

The system 100 may have one or more types of original content. In at least one embodiment, a first media may be specifically designed to trigger physiological reactions. A second media may be scripted content designed to push users down progressive learning path. For example, content may be based on behavioral science and/or Cognitive behavioral therapy (CBT) related to specific quest. For example, the system 100 may ask the user the questions that are modeled after Motivational Interviewing, CBT and Addiction Medicine.

In at least one embodiment, licensed videos, still images and music may be dynamically chosen by the system 100 based on the user personal information. For example, the licensed content may include people, landscapes, actions, foods, events, sports, concerts, music libraries, etc. Licensed content may be stored on third party servers and may be requested by the system 100 when needed.

The system 100 may also comprise images that maybe stored and assembled on device and then synchronized with a cloud.

For example, third party generated content may be available via API, such as, for example, Getty Images, AP Archives, Corbis Motion, Facebook, Twitter, Google+, Instagram, Snapchat, Pinterest, vine, weather feed.

For example, the system 100 may request the user to submit the following information to generate the motivational spark: user gender and/or age and/or ethnicity and/or api data(s) (ex, weather or body weight) and/or goal/habit desire and/or days used and/or user content (e.g., the system 100 may comprise gender/age filter and/or autocorrect filter).

In at least one embodiment, the system 100 may generate a template of a motivational spark for any user and/or each specific user. For example, the template may comprise the information on how long, how many images, how fast the cuts are, what type of music, how much dialog, what text, what order imagery comes in dictated by variable.

For example, the template may be generated by the system before the user-specific sequence and content portions are dynamically rendered on to it. For example, on a 'first day', the system may generate the same base template for all users. This template may further be made unique by the user-specific sequence of content portions. For example, the template may comprise information such as show the username title first, then the peer support, then the demographically sensitive images, use music type x for user y, etc.

For example, the system 100 may comprise the user device 120, augmented reality (AR), virtual reality (VR) and Internet of things (IoT). For example, and without limitation, the user device 120 may include personal computers, laptops, tablets, personal data assistants (PDA), cell phones, smart phones, gaming devices, watches, and other mobile devices. In at least one embodiment, the system 100 may comprise a Personalized Motivational Content Platform for Internet of things (IoT), virtual reality (VR) and augmented reality (AR).

For example, a refrigerator such as, e.g. a smart-fridge, may receive the motivational spark and display it to the user, who wants to keep on track with her diet. In another example, a VR experience may motivate the user to go to the gym.

For example, the motivational spark may be generated based on information of what user imagery and narrative structures work best to inspire this particular user.

For example, the motivational spark may be displayed by the fridge, or any other device.

In at least one embodiment, the system 100 may request and obtain physical data from at least one monitoring device. In at least one embodiment, the application program interface (API) provided by the system 100 may display user physical data, measured by the monitoring device and obtained by the system 100 from the at least one monitoring device, such as calories eaten per day, step counter, weight. For example, the system 100 may use the collected user physical data when determining/updating the motivational action and/or user-specific content portion and/or user-specific sequence of content portions.

In at least one embodiment, the user physical data and/or user personal information may trigger generation of a next motivational spark. For example, the user physical data may be at least one of the following: the Internet of Things (IoT)-enabled weighing scale may discover that the user has gained weight; the user may have consistently elevated heart rate, as discovered by a monitoring device (such as, e.g. Fitbit, Apple HealthKit, blood pressure monitors); or the blood glucose readings have been over a certain threshold as discovered by another monitoring device (such as, e.g. a blood glucose meter). For example, the user physical data may be the fact that the user has watched the prior motivational spark and/or the time of day of that watching.

For example, a step tracker may show user under-performing goals, therefore show relevant goal imagery with numbers to go. For example, the system 100 may obtain such physical data from the step tracker (i.e. a monitoring device), display it and use it when generating next motivational spark. For example, the user physical data may be received from monitoring devices such as, e.g., a "smart shirt" and/or smart watch, which may detect that the user has not received enough sunshine this morning.

For example, if the system 100 receives the information from the user that she has lost 5 lbs (such as, e.g. from a monitoring device that is a weighing scale), the user may be shown a motivational spark comprising a video of friends giving the user an achievement remark, such as "a high five". For example, the system 100 and method may include biometric feedback, e.g., via a monitoring device that is a watch or another portable device.

For example, the user personal data, such as, e.g., the race/age/location/ethnographic profile data may determine the types of content filter (weather-relevant outdoor imagery, appropriate number of racially relevant images, etc.) for the motivational spark.

Geo Location

In at least one embodiment, the motivational sparks may depend on weather and/or location. For example, the system 100 may make contextually-relevant motivational spark.

For example, the system 100 may show specific motivational sparks when the user device 120 is in a coffee shop or another location associated with an unwanted behavior.

For example, the user may identify a coffee shop as a place they habitually consume unwanted food/drink. The user may have filmed/recorded pushing away bad food and picking up good food. The next time the system 100 detects that the user device 120 is at a coffee shop (e.g. if the user has authorized an app installed on the user device to know the user device's location and to receive push notifications), the system 100 may assemble and may show the user the motivational spark with related coffee shop selfie-videos along with other personally relevant imagery.

In another example, the system 100 may detect that the user device 120 is close to a refrigerator (e.g. a smart refrigerator) and may assemble and show relevant motivational sparks on the user device 120.

In at least one embodiment, the system 100 may pick and display contextually relevant overlay imagery designed to aid the user in making a desired association. The motivational spark may be provided in 'real time', rendered on the user device. In other embodiments, the motivational spark may be cloud-based, to be served at relevant times/contexts.

For example, when user points device camera to at undesired temptation (ex, cookies that she wants to stop herself from eating), the system 100 may overlay an onscreen button on the user device 120 that may offer her to select how she wants to see that object in context of a previously identified 'goal' or 'habit.' The system 100 may then show the user personally relevant images and/or video(s) overlaid or cut with object she is pointing at (i.e. to provide an augmented reality display). The user may watch the compiled imagery to trigger desired reaction.

For example, the user may be a smoker who wears the google glasses or augmented reality (AR) glasses (e.g. Google Glass, Microsoft HoloLens, etc). When the user encounters a cigarette, the user may launch the system 100 and may click on a realtime help button which may trigger a camera mode, turning on the camera of the user device 120.

Figure 27:
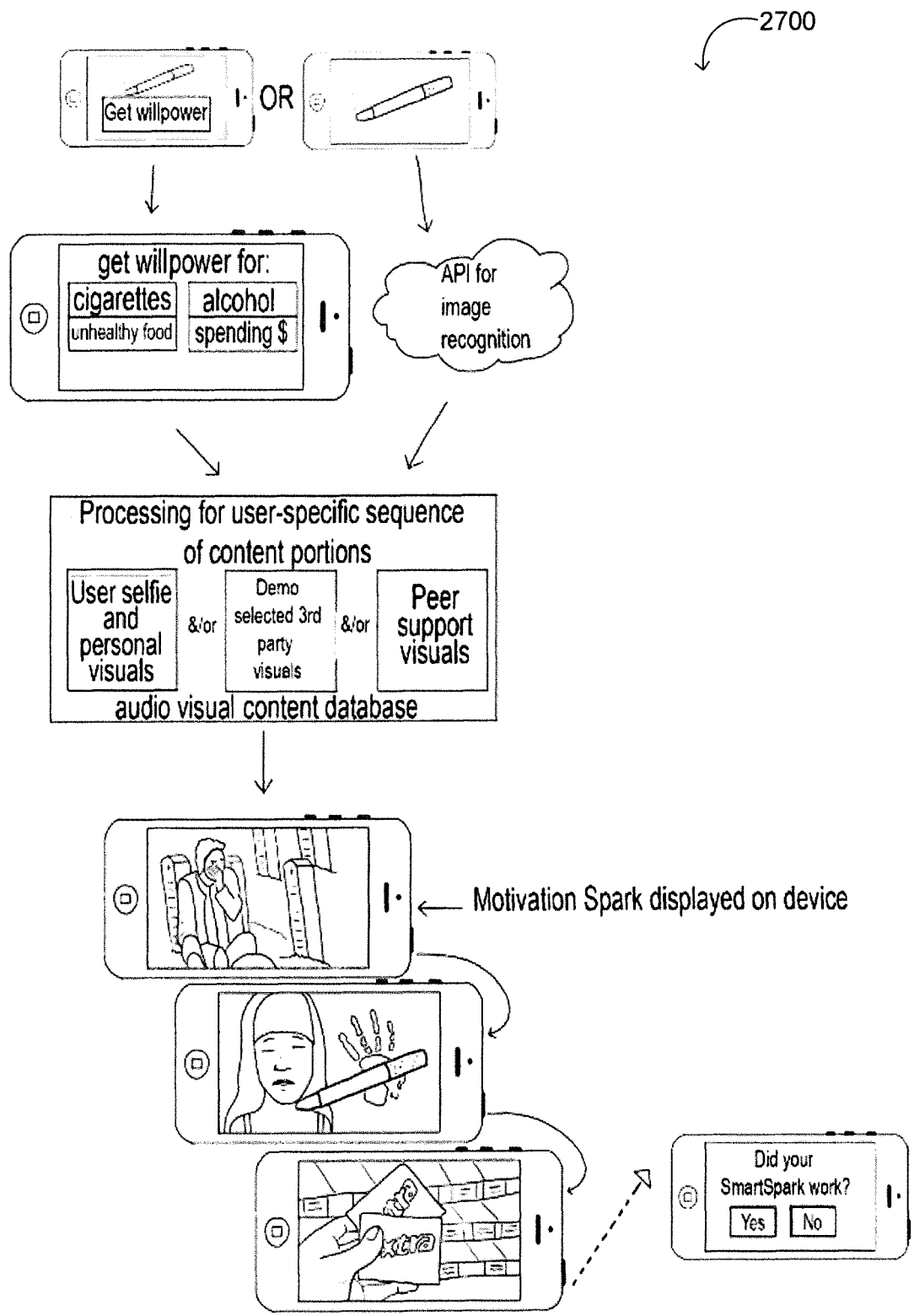
FIG. 27 illustrates an example implementation of the method for generating a motivational spark for a user, in accordance with at least one embodiment.

For example, when the user wears the augmented reality glasses, the user may trigger the application and/or the system 100 may capture the image of the cigarette, and recognize the cigarette, and trigger the generation and/or reception and/or transmission of the motivational spark. An exemplary implementation of a method 2700, where the system 100 has recognized the cigarette, is shown schematically at FIG. 27. For example, the user may have taken a picture of the cigarette (or other temptation as a drug, alcohol, unhealthy food, etc.) and the system has stored the picture of the cigarette as a "temptation".

In at least one embodiment, the system 100 may recognize the cigarette and may send to the augmented reality glasses a specifically generated motivational spark. For example, the motivational spark may be displayed using the AR glasses. Such motivational spark may comprise of images of the user's kids and her dead aunt and the vacation she wants to go on. For example, the motivational spark may be flashing and/or comprise specific audio.

In at least one embodiment, animated words and/or background images may be created from trending social media imagery/music/headlines. For example, the user may see that day's most popular headlines are displayed as text or images in her/his motivational spark (SmartSpark).

In at least one embodiment, the user may be able to post, to a social media site, individual motivational sparks and/or requests for social support (with link for friends to upload support text, photos, videos, etc).

In at least one embodiment, the method may include success tracking and/or the system 100 may be adapted to track success.

In order to optimize the generation of future motivational sparks, the system 100 may determine whether the content portion(s) and/or motivational sparks previously viewed at the user device have been successful.

Figure 21:
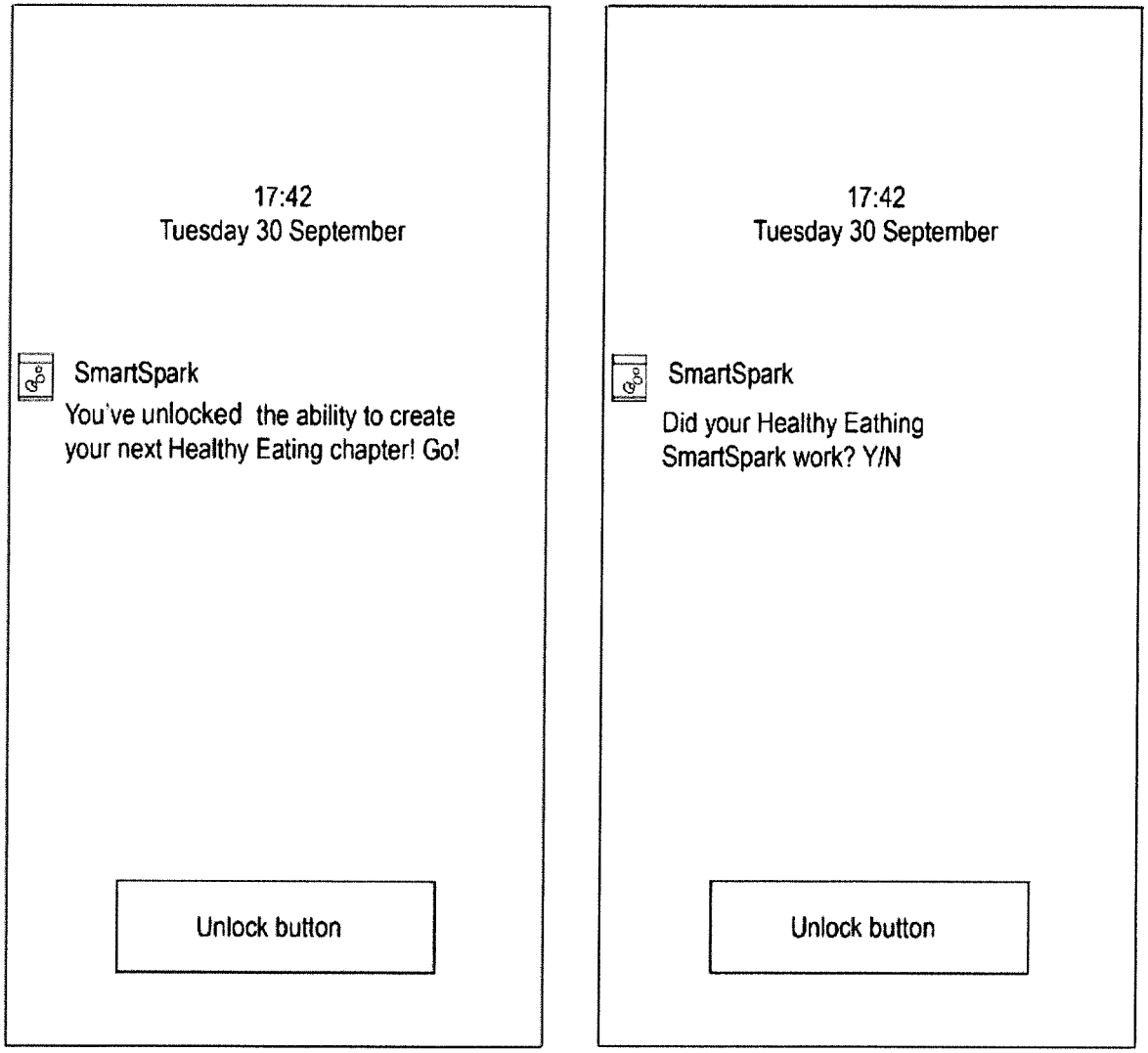

The success of the content portion and/or the motivational spark may be determined based on collected user feedback. In at least one embodiment, the user may be asked for the user feedback, as shown at FIG. 21. For example, the user may be asked to say whether the motivational spark has worked or not. User feedback may be solicited by an application installed in the user device. User feedback may be solicited by SMS query.

In at least one embodiment, the system 100 may determine the success of the motivational spark and/or the content portion(s) based on collected and/or received data other than user feedback. For example, the system 100 may determine the success based on at least one of a number of times the motivational spark has been viewed, whether the motivational spark has been shared on social media and/or other information on social media engagement (e.g. likes, etc.).

In at least one embodiment, the system 100 may determine the success of the motivational spark and/or content portion based on the received/collected biometric data, such as, for example, the user's heart rate, body temperature, glucose levels, and steps taken.

The system may generate a motivational spark as an automatically composed mashup of music, video, still images, and other user-generated content portions, the mashup being created based on A/B optimization of specific variables for achievement of the users' goal.

In at least one embodiment, the system 100 may use A/B testing. A/B testing may rely on the fact that if there is a large enough base of users actively using the system 100, one can test hypotheses in real-time against real users. A/B testing may mean breaking the user population down into different groups, where a first group (B) is the control that uses the existing system 100 and a second group (A) is the test group. For group A, a new feature or any sort of subtle change may be applied to the system 100. Each group may be closely monitored, and statistics may be captured that compare group A using the new feature to the control group B. If it's a successful test, then the change may be adopted for all users of system 100; if not, a different subtle change may be tested.

The user feedback, data other than user feedback, and/or physical data may help to identify which variables may affect outcomes and/or improve the method. The A/B testing may be automated to identify and use most successful content portions. For example, feedback data from users may come in to improve the templates and/or the generation of user-specific of content portions. User device and social data may help to identify which variables affect outcomes and design to optimize the performance of the motivational sparks. The testing may help the system to identify and use the most successful assets. For example, data from users may come in to improve timelines and/or templates. For example, song A may have lower success rate than song B when used in motivational sparks. Song A may be removed from future motivational sparks. Song B may then be tested against song C.

For example, variables for A/B testing (i.e. optimization criteria) may include: original content and/or third party content (which song, which imagery); length of spark; length of peer support video; absence of peer support video; amount of peer support per spark; rate of playback of user generated content portions; reused peer support; POV versus scene footage; how often to reshow user generated content; how much user generated content to include; visual filters; pacing of cuts; narration; pacing of music; time of day; and calls to action types.

For example, the following information may be requested by the system 100 and then used to determine a content of the motivational spark: age, ethnicity, weight of user, time of day, weather, feedback via direct user input (e.g. rate effectiveness via SMS, email or in-app), days of use (sequential, days skipped, times per day), user demographics, added user data over time (e.g., from a personality quiz), third party social network application program interface (API) input, third party device API input (e.g. Apple Watch reporting user's higher heartrate; portable glucose monitor reports reporting spike in blood sugar level, etc), number of times user played the motivational spark, and number of times user shared the motivational spark. For example, the motivational spark may be also determined based on a third party device input in clinical environment (e.g. results of an MRI data, heart rate reading, pupil size, etc).

In at least one embodiment, there may be an original content and third party content (which song, which imagery). For example, imagery may have many classes that vary (humans; emotional states on humans, such as happy and sad). The following variables may change between motivational sparks: the number of images with horizons (i.e. because seeing horizons is said to be calming, in turn because human amygdalae equate horizons with safety); pacing of clips; type of music (genre, pacing, tone); length of spark; length of peer support video; absence of peer support video; amount of peer support per spark; sped up and slowed down user generated content; reused peer support; POV versus scene footage; how often to reshow user generated content; how much user generated content to include; visual filters; pacing of cuts; narration; pacing of music; time of day to deliver; calls to action types; tone (whimsical, serious, scary, quirky); follow up nudges.

For example, the following inputs may trigger a change in the type of the motivational spark produced by the system: time of day; weather; location; feedback via direct user input (like rate effectiveness via SMS, email or in-app); days of use (sequential, days skipped, multiple in one day); user demographics (age, location, race, income, browser, marital status, social graph, children); added user data over time (e.g. personality quiz); new user generated content; new peer support content; third party social network API input; third party device API input (e.g. apple watch says your heartbeat sped up during watching the motivational spark, etc); third party device input in clinical environment (MRI data says that while watching the motivational spark, the user has a particular change in her condition); number of times user played; number of times user shared.

For example, the following variables may change between motivational sparks: original content and third party content (which song, which imagery); length of spark; length of peer support video; absence of peer support video; amount of peer support per spark; sped up and slowed down user generated content; reused peer support; POV versus scene footage; how often to reshow user generated content; how much user generated content to include; visual filters; pacing of cuts; narration; pacing of music; time of day to deliver; calls to action types; tone (whimsical, serious, scary, quirky); follow up nudges.

In at least one embodiment, the system 100 may ask the user to identify at least one additional variable, such as, for example, how much weight the user would like to lose. For example, if the weight that the user would like to lose is over 25 lbs, the user may be shown images of people over 25 lbs overweight. For example, accessing the Apple HealthKit application program interface (API) may enable that weight variable to change automatically. The user may then be asked for demographic information (age, ethnicity) and 'taste' questions such as what type of image they find most relaxing. For example, a 20 year old woman may be shown different images than a 55 year old man.

In at least one embodiment, motivational sparks are different for each user. For example, content portions and motivational sparks may be determined by at least one of the name, user-supplied images, gender, location, and other personal data of each user.

For example, an example user A may submit user personal information defining herself as 20-25 year old woman living in Florida. She may indicate that she likes hiphop music and that she is named Axelle. She may have uploaded images of her baby. Her peers may have sent her many peer support videos (i.e. peer-generated content portions) in the past. She may have uploaded selfie-videos (i.e. user-generated content portions) saying that she wants to lose weight, feel energetic, healthy, attractive. Her user-generated content portions may include dancing and triumphant posing. Her Apple HealthKit may show that she has lost 2 lbs in the past 3 days.

The motivational spark generated for user A may be fast-paced, and include: content portions of friends saying 'go girl!', a hiphop music sound track, an image of her baby, a clip of Serena Williams winning a tennis match, a clip of the FIFA Women's World Cup Final, dancers, an image with triumphant posing, and text that reads, "you're on your way, Axelle; 2 lbs down!"

Another example user B may submit user personal information defining himself as 55+ man living in Minnesota.

User B may indicate that he is named Andrien. User B may indicate that he likes rock ballads, and may have uploaded images of his ideal car. Other input information may be time of the year—e.g. January. User B may have no peer support videos. He may nevertheless have recorded a number of user-generated content portions showing only his hands, with him being heard saying that he wants to live longer. His other user-generated content portions may show only his feet getting (e.g. ready to jog) and his hands (e.g. giving a "thumbs up").

The motivational spark generated for user B may start slower, but build speed (e.g., in terms of the rate of cuts between different content portions) in accordance with rock ballad pacing. The motivational spark may comprise generic images of older men triumphant in snow, jogging, ice-fishing, and/or looking healthy. The motivational spark may also comprise statistics on how exercise may help middle-aged men. The motivational spark may also show the user's feet jogging, and/or other user-generated content portions. The motivational spark may end with the caption, "you can do it, Andrien!"

In another example, if the user inputs user personal information that indicates that the user's mood input is "'angry"' (i.e. that is the user has self-assessed his/her mood as being "angry"), this may trigger the system 100 to play relevant music and display a message within the next smartspark motivational spark such as: "listening to angry music calms you when you're mad."

In at least one embodiment, the generation of the motivational sparks may be based on a number of days accumulated in relation to a user goal (e.g. successful days). In at least one embodiment, the system 100 may initiate and collect information on user-reported assessments and/or progress.

For example, the user may be on day 3 of an exercise user goal (i.e. with two accumulated days of self-reported success). Once the user has done day 3 (e.g. has performed a specific exercise) and has captured her/his good feelings in a user-generated content portion, the system 100 may unlock the next motivational spark for day 4. This motivational spark may also request that the user perform another exercise.

The motivational sparks may be dynamic (i.e. change depending on time and/or location and/or other variables described herein). Personalized behavioral triggers/motivational sparks may build into people's existing habit of checking social messaging, and inserting new personalized videos that includes imagery that may recall structural patterns that the system had the user identify in prior steps.

The system 100 may enable recurring personalized dynamic video creation and delivery based on algorithms that integrate data from the user's social media, device, geo-data and app based input(s). In at least one embodiment, the system 100 may pick and display contextually relevant overlay imagery designed to aid user in desired association. The motivational spark may be provided in 'real time', rendered on the user device. In other embodiments, the motivational spark may be cloud-based, to be served at relevant times/contexts.

Example one. The user has set up a user goal to fit into her ideal wedding dress. A corresponding user behavior step is that she must not eat fattening foods. She comes across a plate of cookies, wants to eat them, but takes out her user device, points the camera of the user device at the cookies, selects an overlaid button labelled "my gorgeous wedding", and the user device overlays the image of the cookie with previously selected negative images from the content library of the user device that include images of a sad bride, a fat person, etc. The user device then immediately shows the user previously selected positive images or image overlays (i.e. user-generated content portions) of a wedding dress, a honeymoon location, etc. This example does not include providing the user with alternative user behavior steps.

Example two. The user wants to quit smoking. When she gets a craving, she activates an application on her user device and pushes a button labelled "Clean Body". She sees a motivational spark that integrates real-time environmental imagery from the device camera. The motivational spark is rendered on the user device, enabling the incorporation of real-time environmental imagery; however, the motivational spark could also be cloud-based and pre-rendered compilation that includes elements from her behaviorally inspired imagery as identified above and unique third party and/or peer-generated content portions. For example, the system 100 may have asked her to pick at least one type of images that the system 100 may use to assemble personalized intelligent image overlays. The system 100 may then prompt the user to select at least one image of the worst things she can imagine if she keeps smoking. She may pick, e.g., images of dead people, her children crying at her funeral, a tracheotomy, and/or lung cancer, etc.

The system 100 may then ask the user to film herself doing at least one alternative behavior or to upload pictures or pick pictures of alternative behaviors (i.e. user-generated content portions). Her example images of alternative behaviors may be, for example: sucking lollipop, eating nicorette gum, jumping jacks, pack of gum, playing tetris, buying clothes, reading, etc. The user device may suggest alternative user behavior steps, and may provide data about their effectiveness. For example, the user may than be prompted to play a quick game of Tetris.

For example, the system 100 may ask the user to pick at least one image that make her feel positive things that come from quitting smoking. Her example images of the positive outcomes of quitting smoking may be her children smiling, high school graduation of her children, beautiful clothes, herself running with ease, pile of money, and/or badge of courage.

For example, the user may be prompted to choose to be asked by the system 100 to identify friends and family for support. The system 100 may use Facebook friends, contact list and/or entry field for her to identify those to support her. The system 100 may then send identified peers invite to send supportive imagery with easy to do instructions. For example, the system 100 may send a request to a peer device to record and send back a peer-generated content portion. For example, the peer device may be any programmable computer and may be connected to the system via the internet and/or intranet. For example, the peer device may receive from the system 100 a request to display the message and to record a video and/or audio. The peer device may also display a message prompting the peer to send to the system support imagery.

For example, the system 100 may prompt the user to take the user device 120 and to take at least one image and/or video of cigarette in her hand. For example, when the user has come to a moment when the user is about to smoke, the user may push a button labeled "Clean Body". The label may be chosen to provide a positive association with the reasons why the user does not want to smoke, as opposed to a negative association (e.g. one that makes the user feel bad; one that suggests the user is quitting or losing something, etc). The system 100 may then generate a motivational spark first showing images of the user's funeral, tracheotomy, then showing the user grabbing a piece of nicotine gum, then showing images of the user with piles of money and beautiful clothes.

Figure 12:
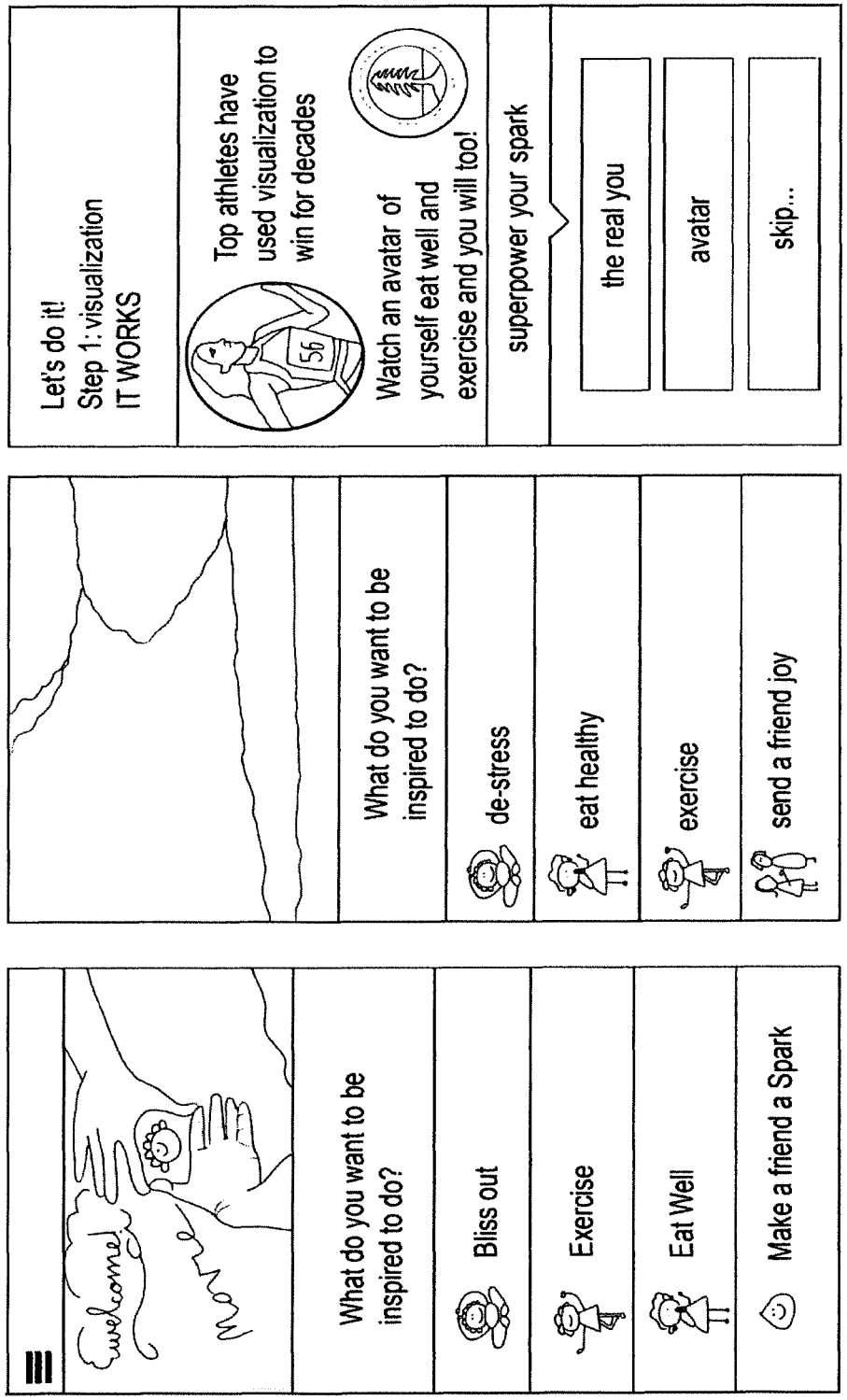

Referring now to FIGS. 12-25, shown therein is a graphical user interface (GUI) provided by system 100 on a user device 120, in accordance with at least one embodiment. When a new user opens the application, the system 100 may display choices and introduction video/banner, as shown in FIG. 12. The user may be requested to choose a goal. For example, the user may choose at least one of a user goal from eating healthy, exercising, "feel bliss", or sending a friend joy.

Figure 13:
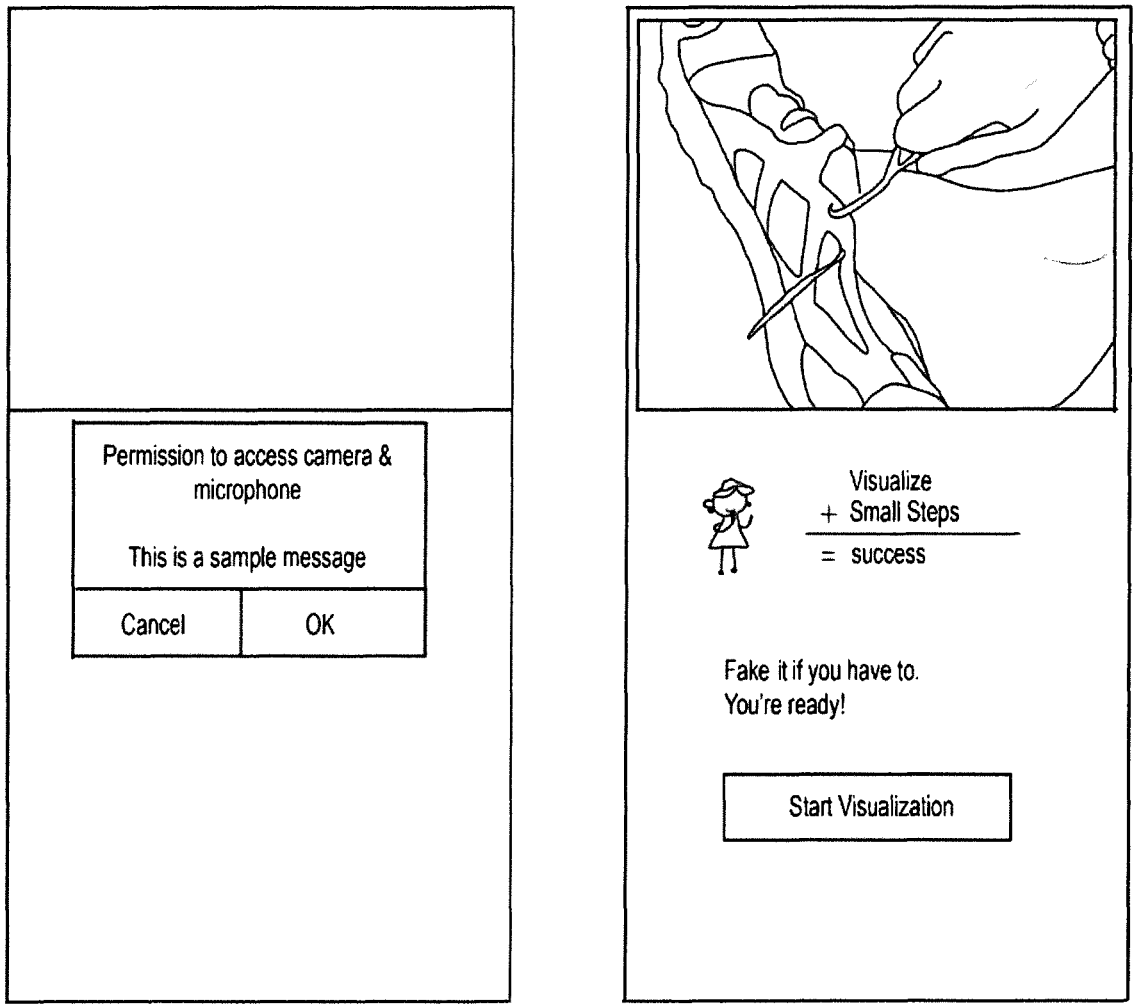

For example, the user may be taken to the landing page, may be shown the first introduction video and requested to hit the start record button. For example, the system 100 may ask for a permission to use the camera, as shown in FIG. 13. If user denies permission, second alert screen may appear saying that their privacy is 100%, etc. Permission may be requested again. If permission is denied again, the user may be told that they will be given a less effective motivational spark. The system 100 may then display a schedule screen.

Figure 14A:
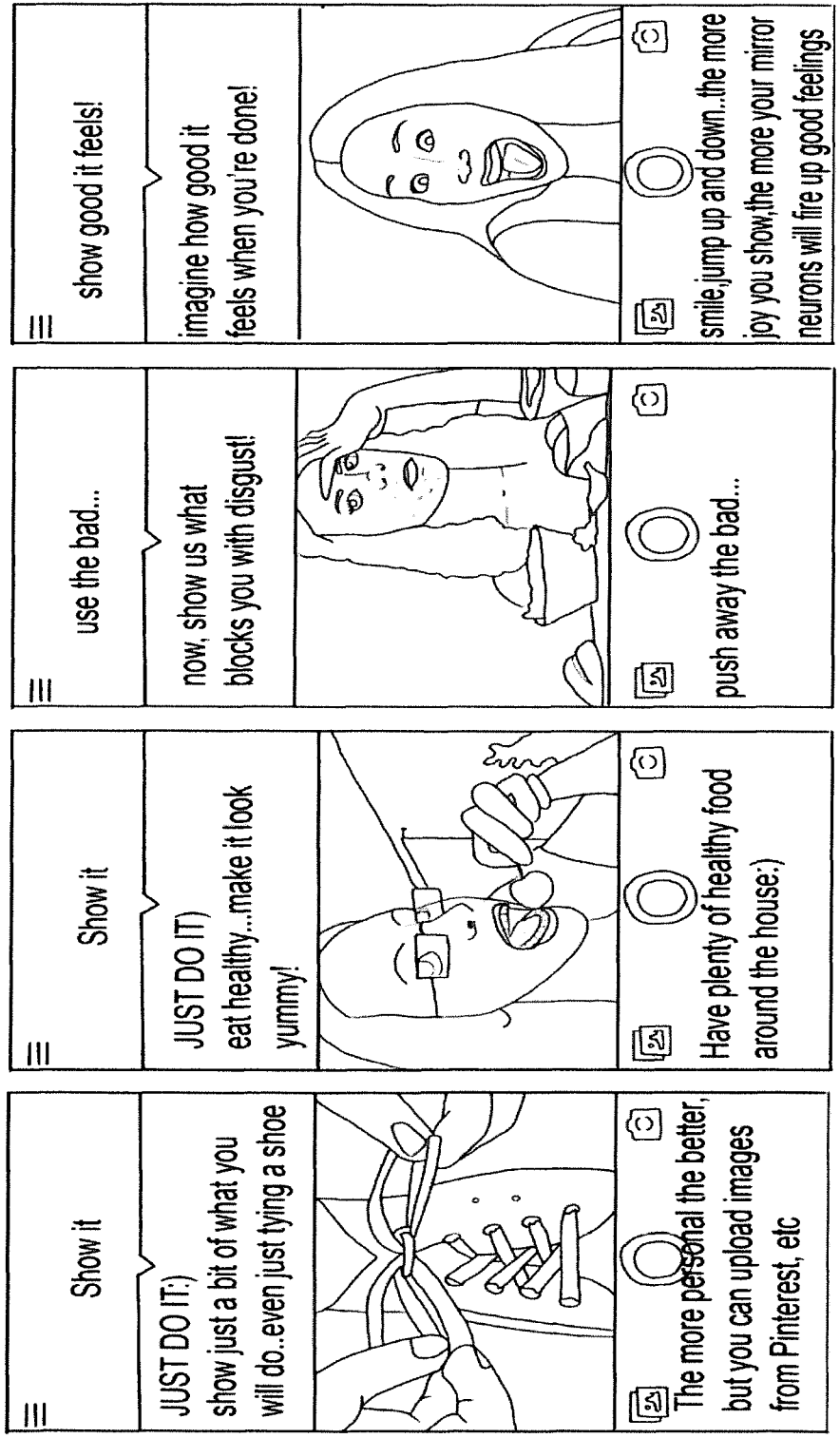
Figure 14B:
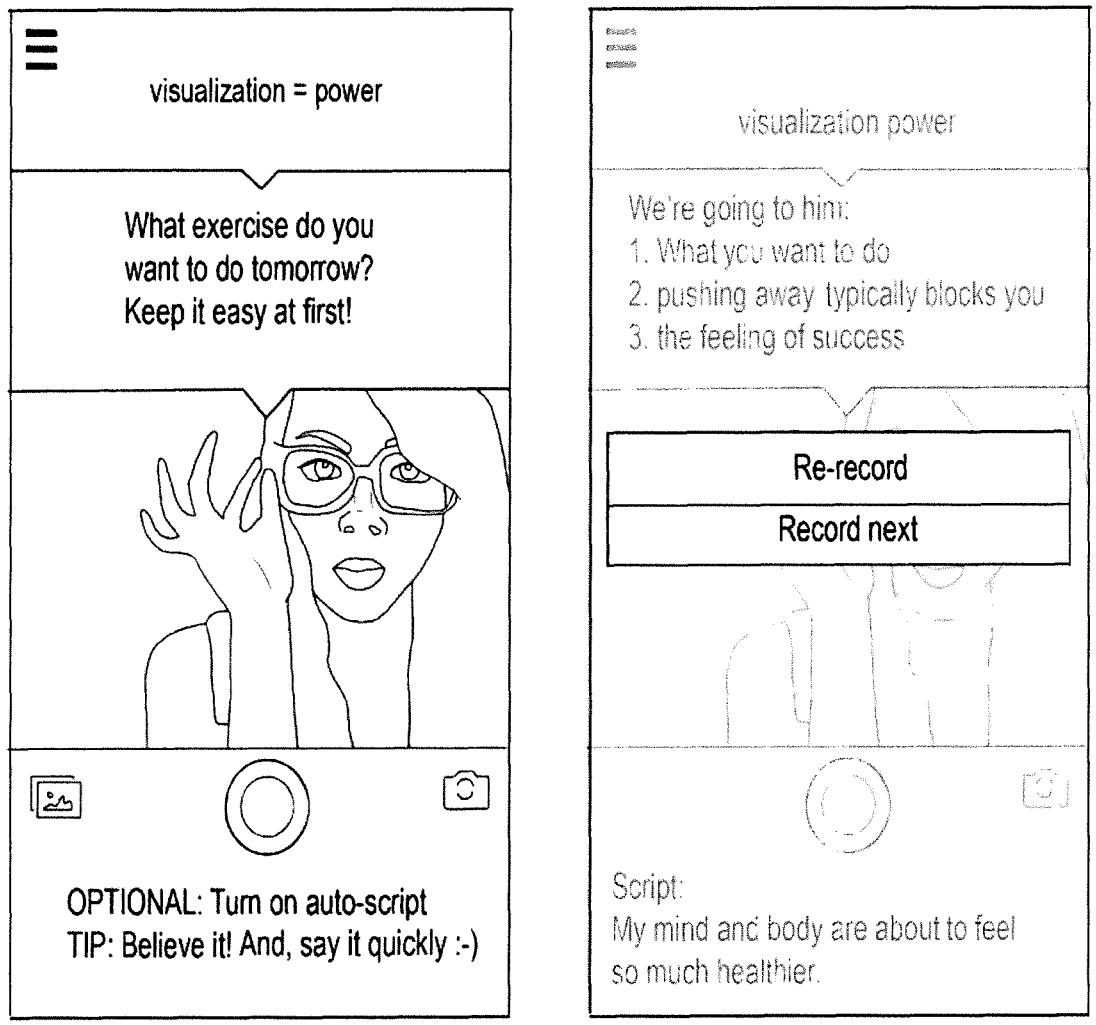
Figure 15:
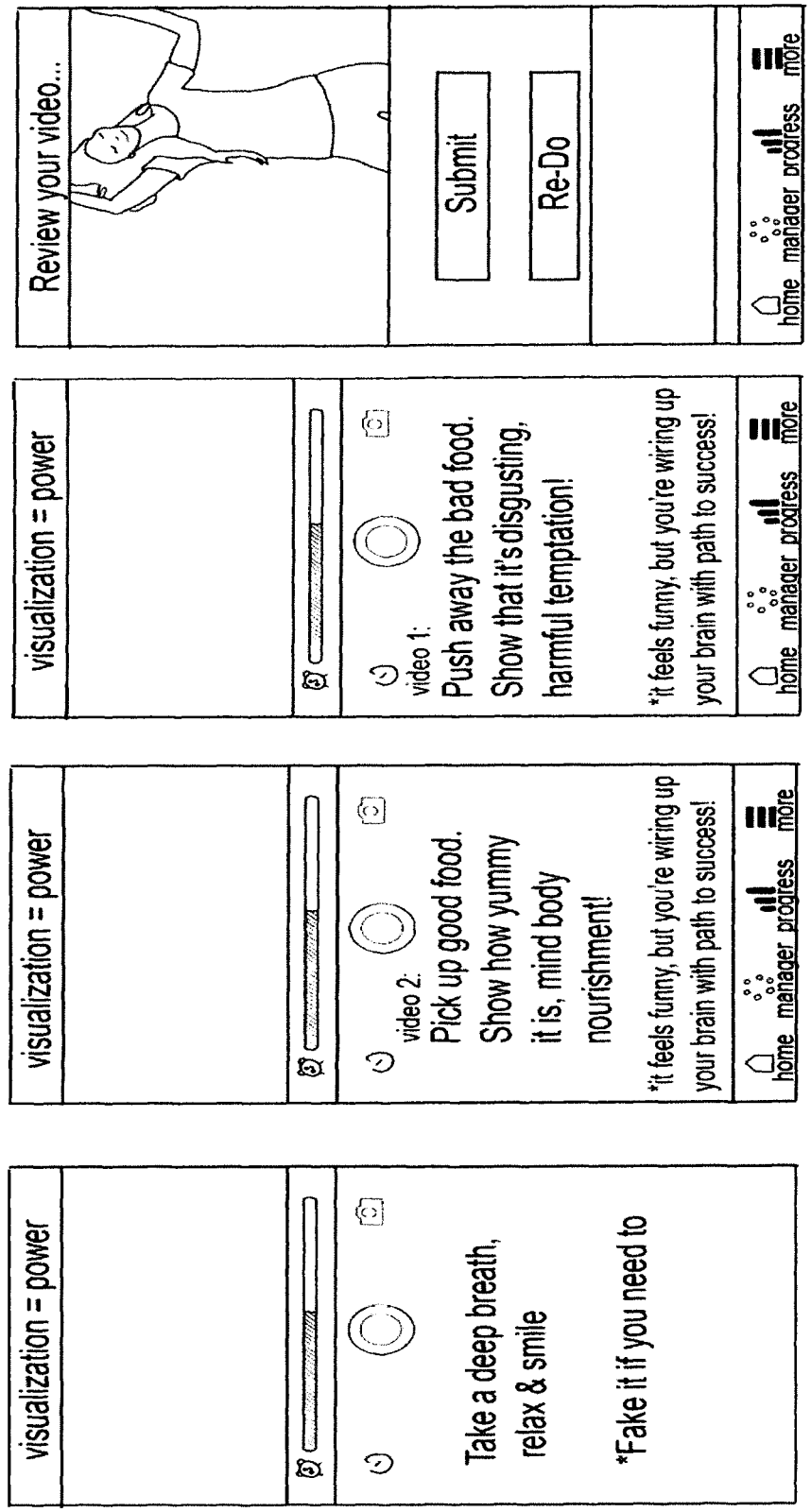

FIGS. 14-15 shows screens of the GUI provided by system 100 for recording a selfie (i.e. a user-generated content portion), in accordance with an embodiment. For example, the system 100 may show record window in landscape orientation. For example, the motivational sparks may be landscape-oriented. For example, the system 100 may display at least one instruction for the user. For example, the message may be "Film yourself taking a deep breath".

For example, each user-generated content portion (segment) that is filmed may have its own unique maximum time allowed. For example, there may be a timer for 'film yourself taking a deep breath' of 10 seconds. There may be an onscreen timer and/or a request displayed by the system 100, such as, e.g. 'film yourself saying how great you'll feel when you've had a moment of relaxation", may have a 20 second maximum. After recording has stopped, the user may be proposed to play back the user-generated content portion (segment) and to choose to submit or to re-record the user-generated content portion. For example, the "selfie record" step may have ability to capture text fields and may ask the user for permission to access photo album. For example, the system 100 may request a user's permission to access the user's photo album to upload pictures (e.g. family pictures). For example, the system 100 may request the user to type in her/his favorite city. For example, a track may ask to add 'access photo album' permission.

Figure 16:
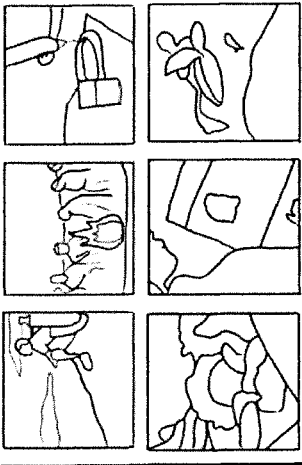

FIG. 16 shows screens of the GUI provided by system 100 for obtaining user personal information, in accordance with an embodiment.

Figure 17:
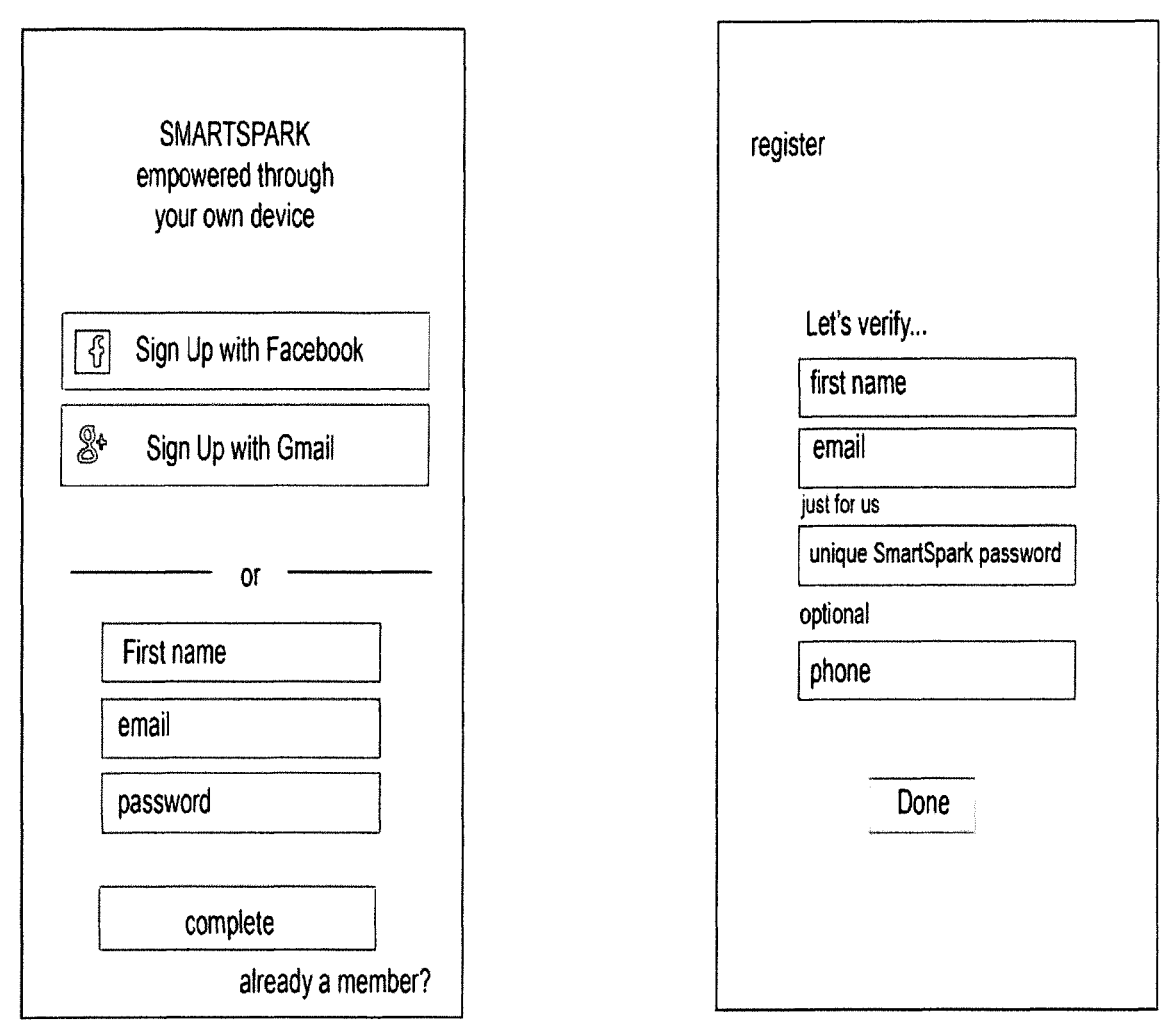

FIG. 17 shows screens of the GUI provided by system 100 for registering a user (sign-up). For example, the user may register via Google, Facebook, Twitter, and/or other service and social networks. The system 100 may then display a verification screen. The user may be requested to provide: first name; email; unique password; and/or a phone number for SMS alerts. Some of this information may be used as sign-in information, to be submitted when the user wishes to subsequently sign-in.

Figure 18:
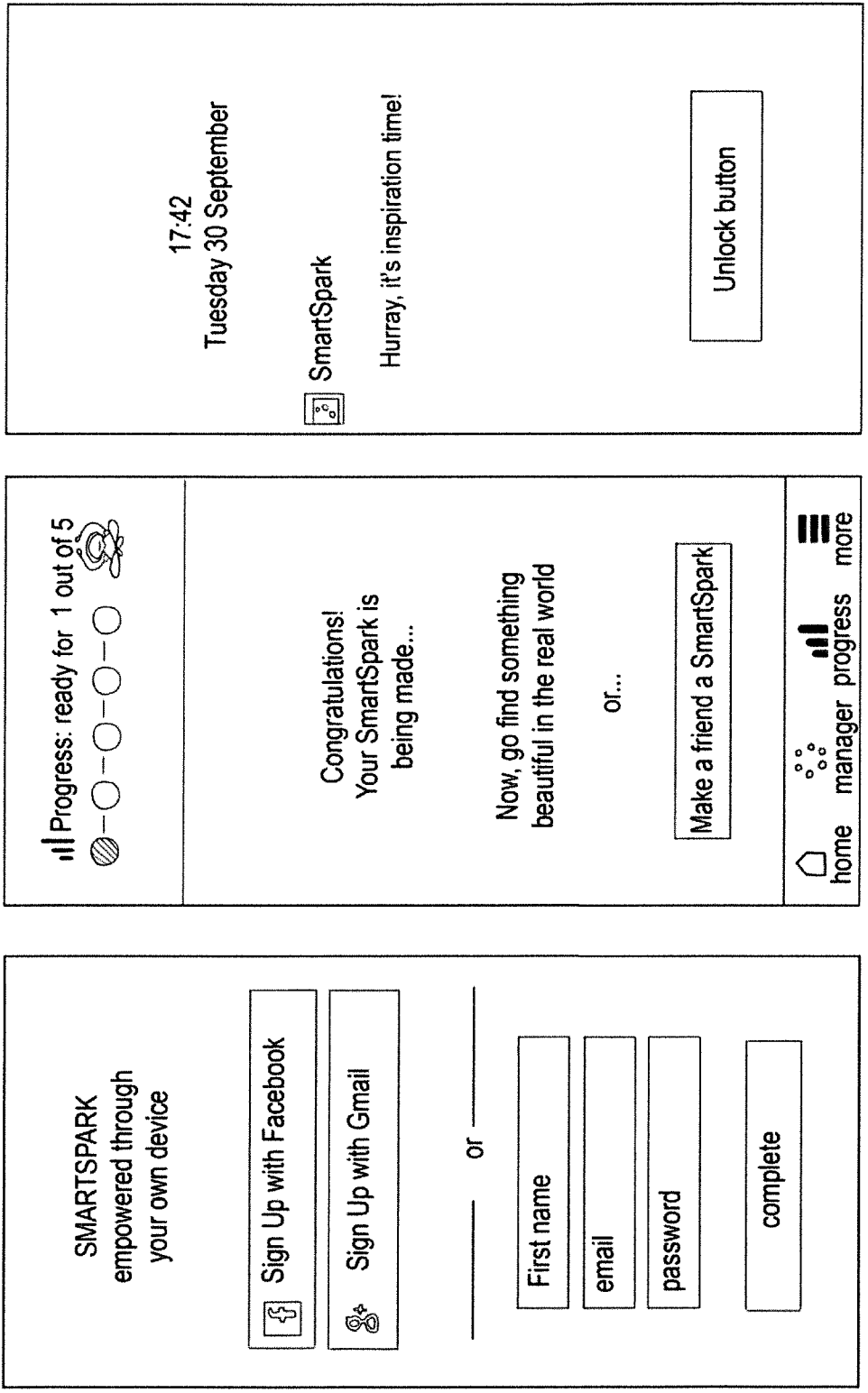

FIG. 18 shows screens of the GUI provided by system 100 for collecting sign-in information from the user (i.e. to sign-in the user), and a user confirmation screen for a returning user. The user may be presented with options: to edit a motivational spark schedule (e.g. a "return to schedule screen" button); to tweak user-generated content portions (e.g. a "redo selfie videos" button); and to send a friend motivation (e.g. a "friends" button). The user may also be congratulated that the user has completed day 1 of 9 in relation to a user behavior step or a user goal, and one or more progress meters may be displayed on the screen in relation to one or more user behavior steps or user goals.

Figure 20:
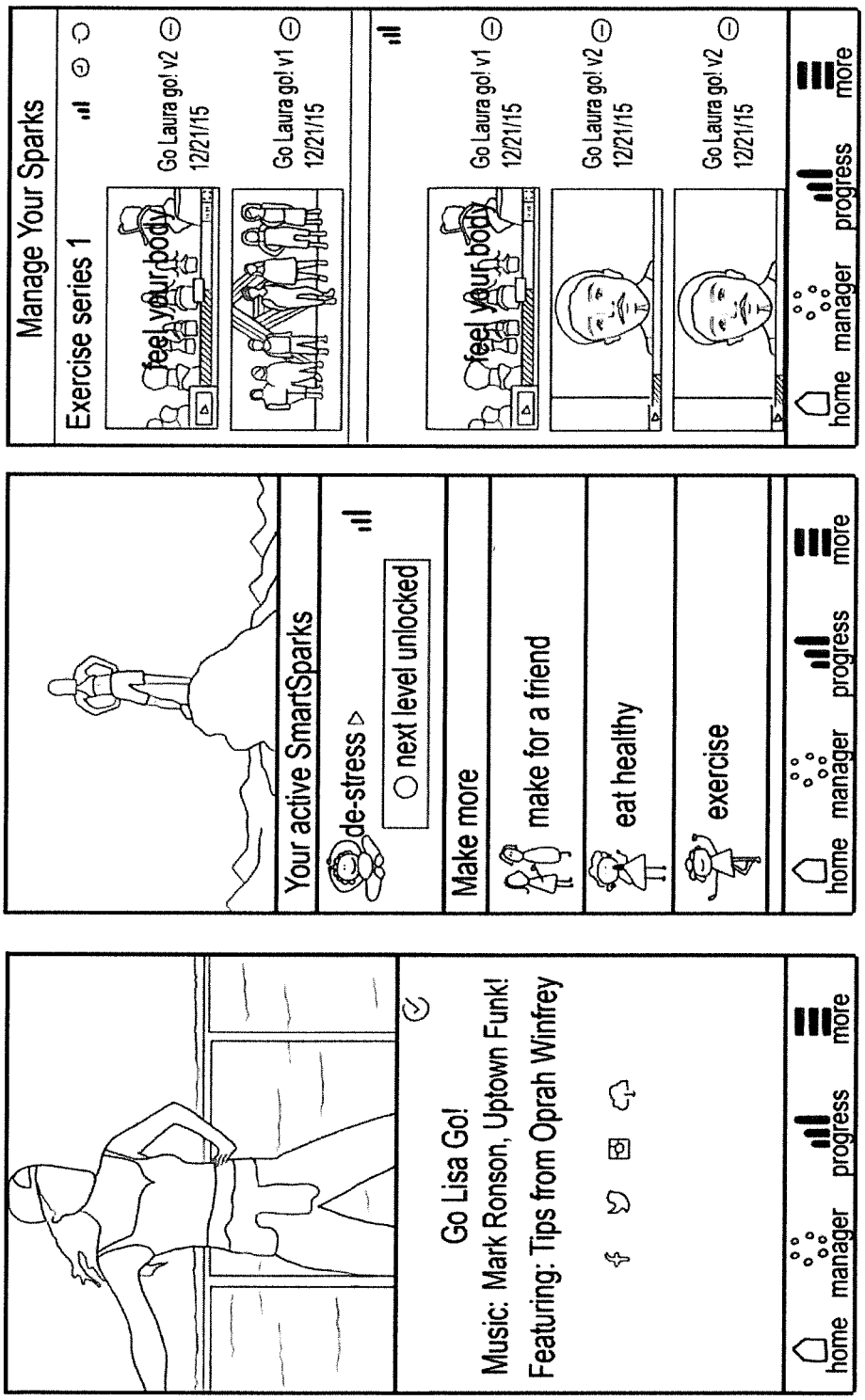

FIGS. 18 and 20 show an example embodiment of screens of the GUI provided by system 100, here displaying a page to a returning user. For example, the system 100 may display instructions for unlocking their next motivational spark. The system 100 may take the user to a video recording screen (e.g. the GUI of FIGS. 14-15). The GUI may show a motivational spark. The GUI may show an active track, tracking the progress of the user with regard to a particular user goal. In relation to a particular user goal or active track, the GUI may also provide a "play" button if the user has a previous motivational spark; a "progress" button for bringing up information about the user's progress; and an "add visualization" button for, e.g. adding new user-generated content portions. The GUI may also provide buttons for creating peer-generated content (i.e. for peers), and for selecting any non-active tracks (i.e. associated with other user goals) that are not currently selected as the active track.

Figure 19:
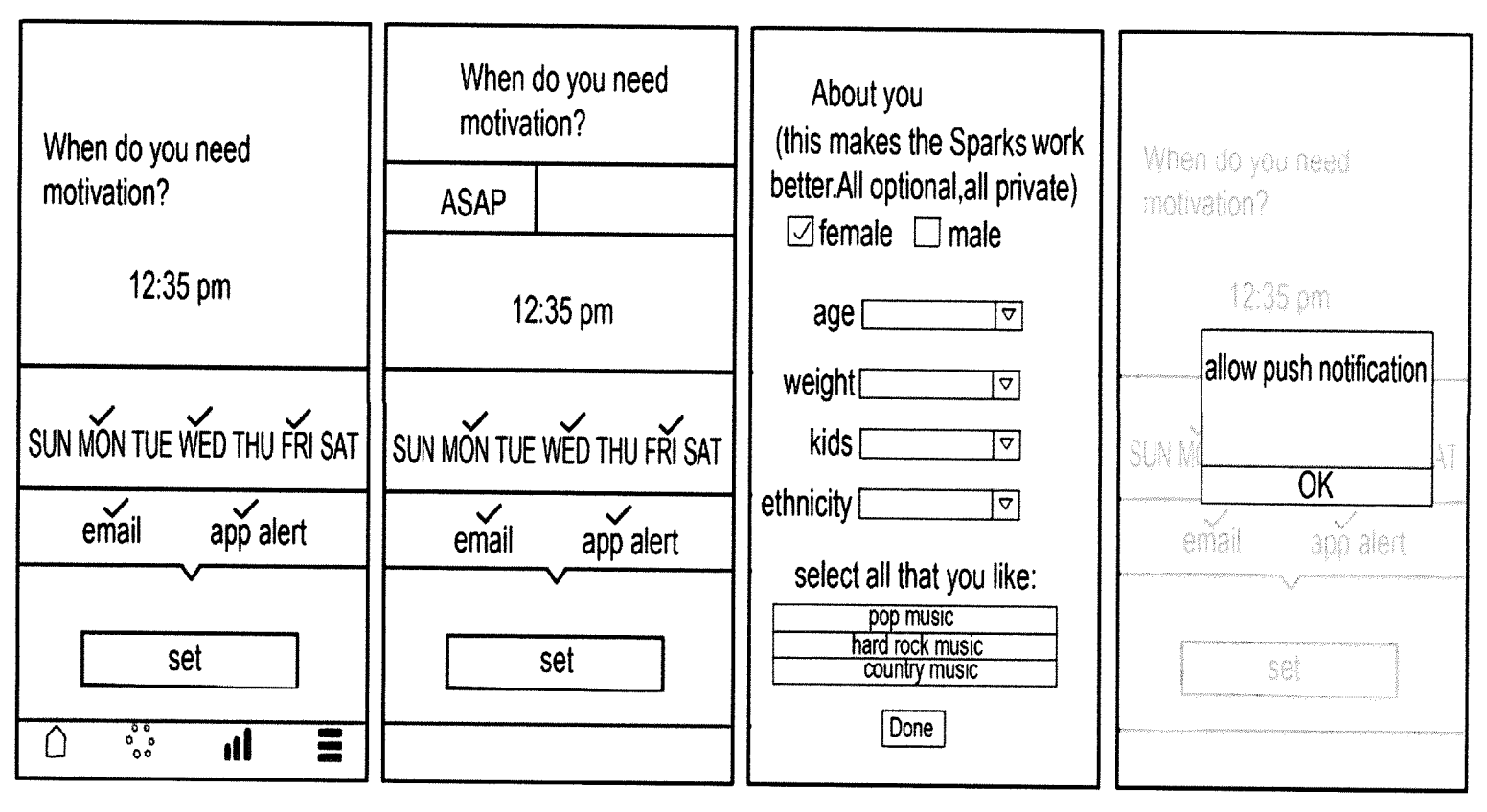

FIG. 19 shows an example embodiment of screens of the GUI provided by system 100, here for managing motivational spark schedules. For example, the user may choose to receive motivational sparks one time per day or several times per week. The user may also schedule receiving the motivational sparks at a specific time of the day or a week or a month and/or at a specific location of the user device 120. The same request may be displayed for returning user or editing schedule. The returning user may also be provided with a "pause" button to pause future motivational sparks.

The user may be requested to submit answers to a few questions to help select relevant user-specific content portions in relation to scheduled motivational sparks. For example, the data may comprise age and gender.

FIG. 20 shows an example embodiment of screens of the GUI provided by system 100 displaying a personalized home page for a returning user. The page may show links to user-specific content portions relevant to the user. The page may also show links to user goals currently active, or options for future user goals. The page may also provide the user with options for sharing motivational sparks and other content on a social network (e.g. Facebook, Twitter, Instagram). The page may also provide the user with the option to download content.

If there are user-generated content portions that have not been mixed into a motivational spark yet, the user may also be provided with a "redo" icon to tweak and edit those user-generated content portions.

FIG. 20 also shows an example embodiment of the GUI provided by the system 100, here displaying a motivational spark manager. Here, the user may be provided with the option to see, in relation to the user's user goals, any and all past motivational sparks. The user may also be able to modify the schedule of delivery of the motivational sparks at any time. The user may be provided with the option to delete the previous motivational sparks at any time by pressing a delete button and confirming the delete action.

FIG. 21 shows an example of an alert provided by the system 100 for notifying the user that the motivational spark has been generated and delivered to the user device 120. The alert may be delivered via an interface of the user device (e.g. push notifications), SMS message, and/or email. As described herein the motivational sparks may be delivered at time determined by the user (see, e.g., FIG. 19). An alert inviting the user to check/open the generated motivational spark may be displayed on the screen of the user device while the user device is locked. The alert may prompt the user to respond as to whether the motivational spark has worked. The alert may be generated on the server and then sent from the server 110 to the user device and then displayed on the user device 120 via the application and/or email and/or SMS.

In some embodiments, the system 100 may also require that the user, the day before the motivational spark is scheduled, create a user-generated content portion. For this, an alert may be provided at the user device.

Figure 22:
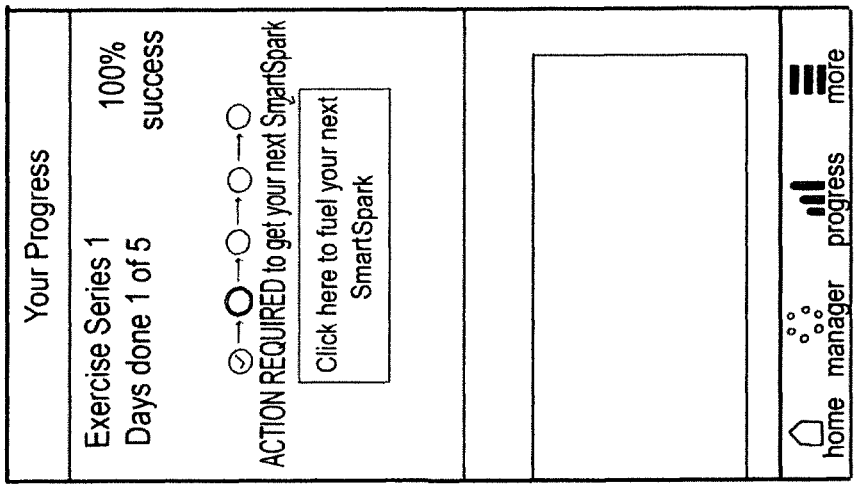
Figure 22:
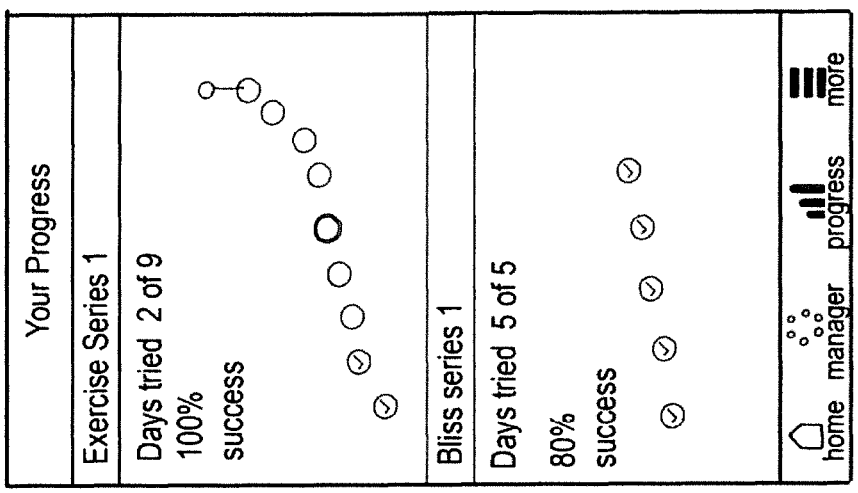
Figure 22:
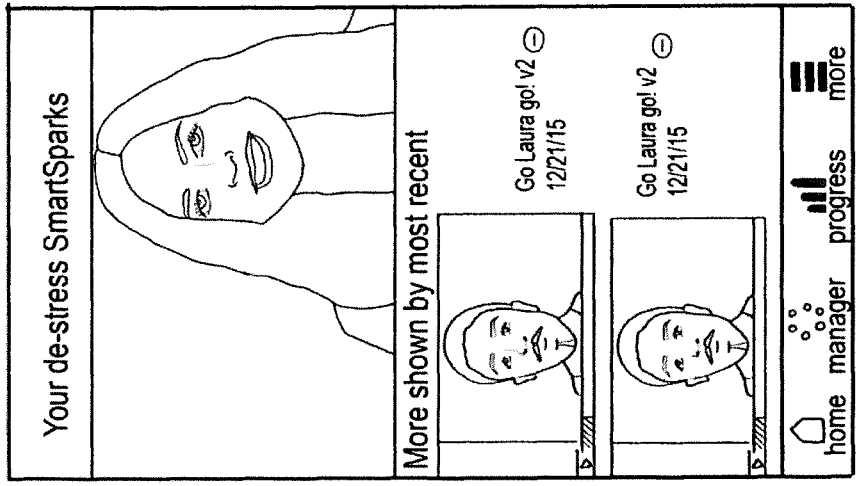

FIG. 22 shows an example embodiment of screens of the GUI provided by the system 100, here displaying progress of the user in relation to one or more user goals. A user goal may be associated with a track displayed in the GUI. For each track or user goal (e.g. mindfulness, eat healthy, exercise), there may be a 'progress' page. The he system 100 may also determine and provide the following information in relation to each track or user goal: days pursued (e.g. with a default to show an end at 9 days), and success determined as percentage of positive and negative responses of the user (i.e. user feedback).

In at least one embodiment, success may be measured based on user feedback (see, e.g., FIG. 21). For example, success may be shown in the first row of the track of a user goal as a percentage of positive responses. For example, if the user has been using the system during 4 days and marked 3 days of those 4 days as having succeeded with a user goal, then the user's success (here as a rate) may be 75%.

Additionally, if the user goal can be tied to a biometric/physical data source, then another success meter may be provided for that user goal, e.g., for hitting a biometric/physical data goal. For example, in Type 2 Diabetics with Portable Glucose monitor, a success meter may show how often the user was able to keep glucose levels within desired levels.

Shown at FIG. 26 is an example embodiment of screens of the GUI provided by the system 100, here to display with success rate of the user. The system 100 may show whether the user's A1C levels are below 7%. If the user goes outside of determined levels during one day, then this day may be considered by the system as a failure day.

For example, the success rate may be based on a count of steps taken (e.g. by Apple HealthKit, a Fitbit, or other monitoring devices), where the user goal is to hit a specified number of steps in a day (e.g. 10,000 steps/day). If the user underperforms (i.e. if the system 100 receives the data from the monitoring device showing that the user did not do the specified number of steps that day), the system may count this as a failure and may count the day as a failure day. On the other hand, if the user has hit 10,000 steps/day, that day may be counted as a successful day. The success rate may be calculated as a number of successful days over the total number of days since the user has begun pursuing the user goal.

The GUI may also display the number of user-generated content portions and/or images of things the user loves, and/or total times watched of all motivational sparks.

Figure 23:
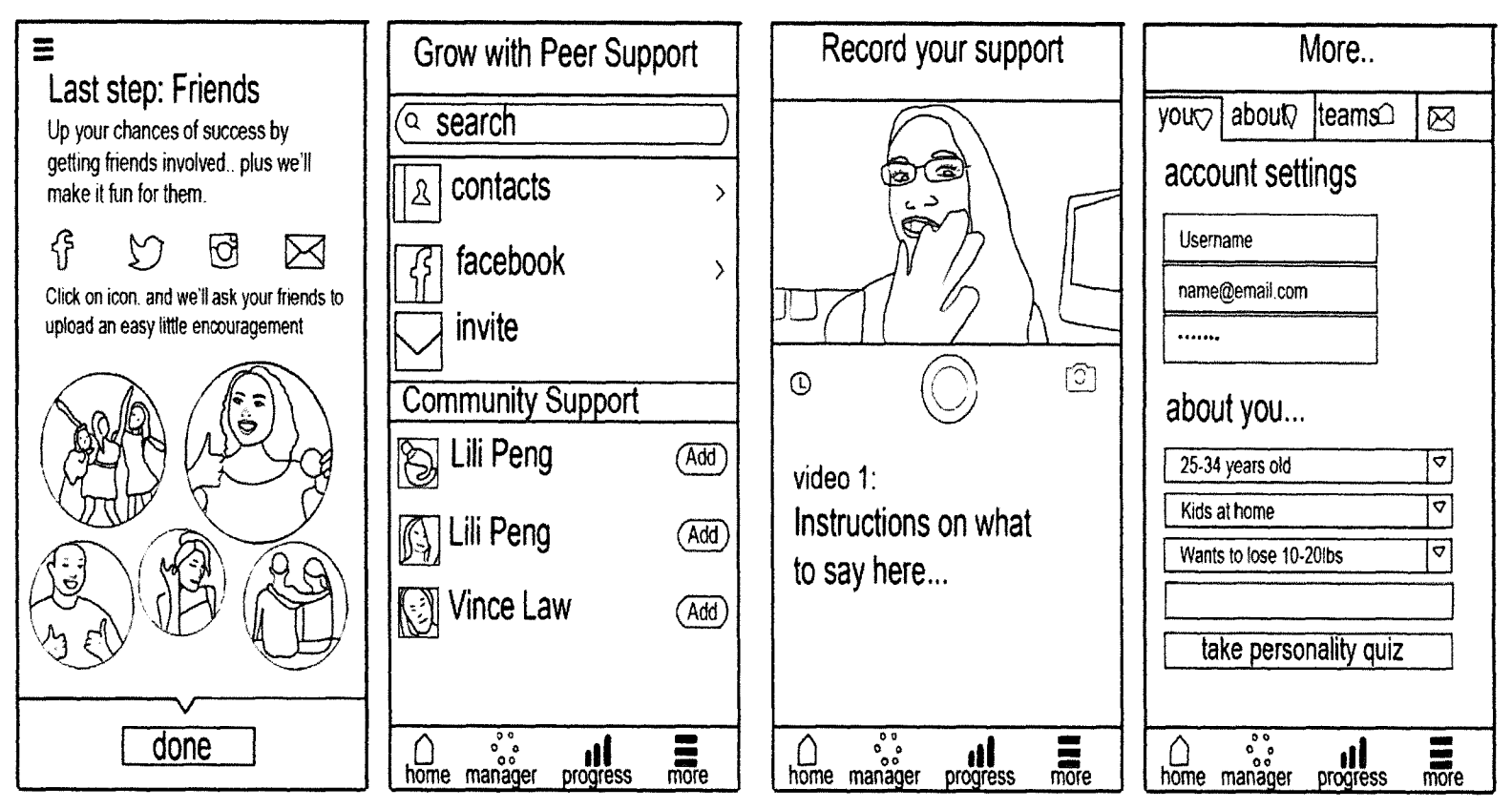
Figure 24:
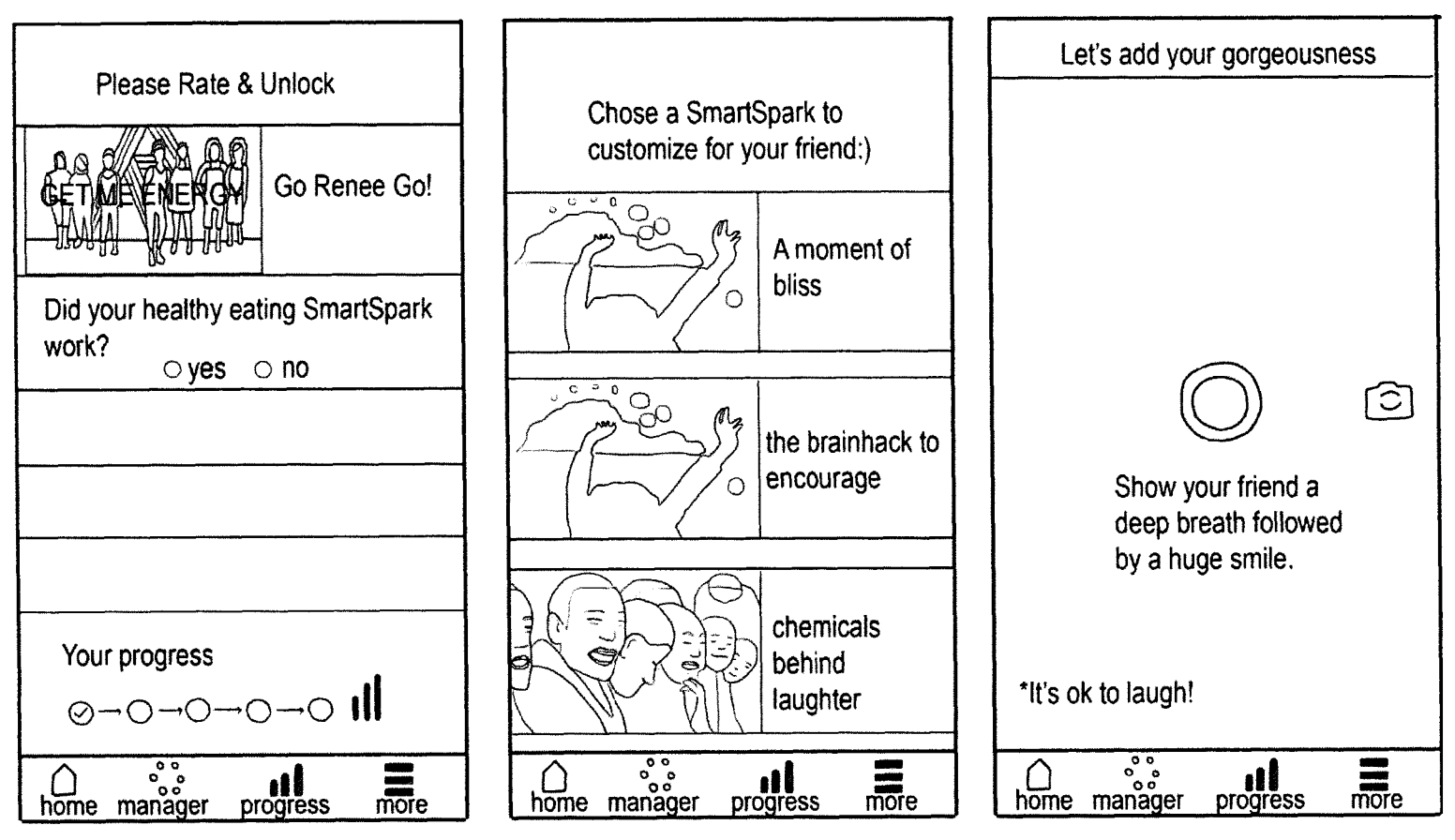
Figure 25:
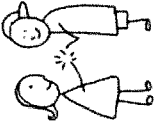

Referring now to FIGS. 23-25, shown therein is an example embodiment of screens of a GUI provided by system 100, here adapted to obtain and display peer-generated content portions (also referred herein as peer support videos). For example, the GUI may provide text instructions and request information such as friends' names, emails or phone numbers (e.g. for the delivery of information, including a motivational spark over an SMS). The GUI may also request that the user record peer-generated content portions for a friend.

A number of embodiments have been described herein. However, it will be understood by persons skilled in the art that other variants and modifications may be made without departing from the scope of the embodiments as defined in the claims appended hereto.

The invention claimed is:

1. A method for generating a motivational video for a user, the method comprising:
   sending, from an application on a server to a user device having a camera, a user content request as a link via at least one of SMS, email, or app push alert, the user content request comprising a prompt, from a website hosted on a remote server and accessible by a web app on the user device, to record at least one user-generated content portion by the camera on the user device;
   receiving the at least one user-generated content portion by the application on the server from the user device, the at least one user-generated content portion being recorded by the camera on the user device and transmitted by the user device to the application on the server;
   storing the at least one user-generated content portion on the server;
   loading, by the application on the server, a base template for video rendering comprising optimization criteria and template content tags;
   tagging, by the application on the server, each of the at least one user-generated content portion with user content tags;
   receiving, by the application on the server, user personal information;
   selecting, by the application on the server, the at least one user-generated content portion and third-party content needed to finalize the base template, based at least in part on the user personal information;
   determining, by the application on the server, a set of relevant content tags from the template content tags for the selected at least one user-generated content portion and the selected third-party content;
   identifying, by the application on the server, a highest ranking match for the set of relevant content tags for the selected at least one user-generated content portion and the selected third-party content based at least in part on the optimization criteria;
   mixing, by the application on the server, the at least one user-generated content portion with the third-party content identified at least in part by the highest ranking match to finalize the base template; and
   dynamically rendering the motivational video, by the application on the server, based at least in part on the finalized base template.

2. The method of claim 1, further comprising determining at least one motivational action to be performed while recording the at least one user-generated content portion based on a user goal, the user goal being obtained from the user on the user device and transmitted by the user device to the application on the server.

3. The method of claim 1, further comprising determining, at least one motivational action to be performed while recording the at least one user-generated content portion based on a user behavior step, the user behavior step being determined by the application on the server or being obtained from the user on the user device and transmitted by the user device to the application on the server.

4. The method of claim 1, further comprising determining at least one motivational action to be performed while recording the at least one user-generated content portion based on the user personal information and/or user physical data obtained from the user on the user device and transmitted to the application on the server.

5. The method of claim 3, wherein the user is prompted on the user device to provide the user personal information prior to generating the motivational video, the user personal information being at least one of gender, age, ethnicity, or location, and transmitting the user personal information from the user device to the application on the server.

6. The method of claim 1, wherein the motivational video is generated based on user physical data, the user physical data being obtained from at least one monitoring device connected to the user device and transmitted from the user device to the application on the server.

7. The method of claim 1, further comprising determining at least one motivational action to be performed while recording the at least one user-generated content portion based on the user physical data, the user physical data being obtained from at least one monitoring device connected to the user device and transmitted from the user device to the application on the server.

8. The method of claim 1, wherein the application on the server requests, via at least one of SMS, email, or push notification, a peer-generated content portion from a peer device, the peer device being different from the user device, receives the peer-generated content portion from the peer device, and mixes the peer-generated content portion with the at least one user-generated content portion to generate the motivational video.

9. The method of claim 1, wherein the at least one user-generated content portion comprises at least one of a video, a picture, a text, or an audio recording obtained from the user on the user device and transmitted by the user device to the application on the server.

10. The method of claim 1, further comprising requesting and receiving the third-party content via at least one of API, web link, or email, by the application on the server.

11. The method claim 1, wherein the third party content is filtered based on the user personal information by the application on the server.

12. The method of claim 1, further comprising requesting the user, on the user device, to schedule the motivational video to be transmitted to the user device at least one of a specific time or a specific location of the user device.

13. The method of claim 1, further comprising requesting and receiving user feedback by requesting the feedback on the user device and transmitting the feedback to the application on the server.

14. The method of claim 1, wherein the optimization criteria comprises at least one of a time-related criteria, user's preference, length of motivational video, length of peer support video, pacing of music, pacing of content portions, user feedback, or feedback on user physical data on the application on the server.

15. The method of claim 1, further comprising sending, from the application on the server via at least one of SMS or email, a request for and receiving the third-party content stored on a database, the third party generated content being at least one of a video, a picture, a text, or an audio recording.

16. A non-transient computer-readable medium comprising instructions executable by one or more processors, wherein the instructions, when executed, configure the one or more processors to collectively:

send, to a user device having a camera, a user content request as, a link via at least one of SMS, email, or app push alert, the user content request comprising a prompt, accessible by a web app on the user device, to record at least one user-generated content portion by the camera on the user device;
receive the at least one user-generated content portion, the at least one user-generated content portion being recorded by the camera on the user device and transmitted by the user device;
store the at least one user-generated content portion;
load a base template for video rendering comprising optimization criteria and template content tags;
tag each of the at least one user-generated content portion with user content tags;
receive user personal information;
select the at least one user-generated content portion and third-party content needed to finalize the base template, based at least in part on the user personal information;
determine a set of relevant content tags from the template content tags for the selected at least one user-generated content portion and the selected third-party content;
identify a highest ranking match for the set of relevant content tags for the selected at least one user-generated content portion and the selected third-party content based at least in part on the optimization criteria;
mix the at least one user-generated content portion with the third-party content identified at least in part by the highest ranking match to finalize the base template; and
dynamically render the motivational video based at least in part on the finalized base template.

17. A motivational system for generating a motivational video, the motivational system comprising:
a memory storing computer readable instructions; and
at least one processor configured to execute the computer readable instructions, the computer readable instructions configuring the at least one processor to collectively:
send, from an application on a server to a user device having a camera, a user content request as a link via at least one of SMS, email, or app push alert, the user content request comprising a prompt, from a website hosted on a remote server and accessible by a web app on the user device, to record at least one user-generated, content portion by the camera on the user device;
receive the at least one user-generated content portion by the application on the server from the user device, the at least one user-generated content portion being recorded by the camera on the user device and transmitted by the user device to the application on the server;
store the at least one user-generated content portion on the server;
load, by the application on the server, a base template for video rendering comprising optimization criteria and template content tags;
tag, by the application on the server, each of the at least one user-generated content portion with user content tags;
receive, by the application on the server, user personal information;
select, by the application on the server, the at least one user-generated content portion and third-party content needed to finalize the base template, based at least in part on the user personal information;

determine, by the application on the server, a set of relevant content tags from the template content tags for the selected at least one user-generated content portion and the selected third-party content;

identify, by the application on the server, a highest ranking match for the set of relevant content tags for the selected at least one user-generated content portion and the selected third-party content based at least in part on the optimization criteria;

mix, by the application on the server, the at least one user-generated content portion with the third-party content identified at least in part by the highest ranking match to finalize the base template; and dynamically render the motivational video by the application on the server, based at least in part on the finalized base template.

\* \* \* \* \*